(12) United States Patent
Chen et al.

(10) Patent No.: US 11,134,048 B2
(45) Date of Patent: Sep. 28, 2021

(54) COMMUNICATION AND MESSAGING SYSTEM

(71) Applicant: DingTalk Holding (Cayman) Limited, Grand Cayman (KY)

(72) Inventors: Hang Chen, Hangzhou (CN); Zhenhao Wu, Hangzhou (CN); Lili Zhang, Hangzhou (CN); Chenlu Guo, Hangzhou (CN); Feng Bao, Hangzhou (CN); Liying Yu, Hangzhou (CN); Yuan Zhang, Hangzhou (CN); Qi Dong, Hangzhou (CN); Kaikai Yu, Hangzhou (CN); Qing Ren, Hangzhou (CN); Junshao Zhang, Hangzhou (CN); Yi Zhang, Hangzhou (CN); Jiarui Shi, Hangzhou (CN); Jie Du, Hangzhou (CN)

(73) Assignee: DingTalk Holding (Cayman) Limited, Grand Cayman (KY)

( * ) Notice: Subject to any disclaimer, the term of this patent is extended or adjusted under 35 U.S.C. 154(b) by 0 days.

(21) Appl. No.: 16/745,026

(22) Filed: Jan. 16, 2020

(65) Prior Publication Data
US 2020/0153775 A1 May 14, 2020

Related U.S. Application Data

(63) Continuation of application No. 15/040,659, filed on Feb. 10, 2016, now Pat. No. 10,587,559.

(30) Foreign Application Priority Data

Feb. 16, 2015 (CN) .......................... 201510084373.6

(51) Int. Cl.
*G06F 3/00* (2006.01)
*H04L 12/58* (2006.01)
(Continued)

(52) U.S. Cl.
CPC .......... *H04L 51/22* (2013.01); *G06F 3/04847* (2013.01); *G06F 3/165* (2013.01); *H04L 51/24* (2013.01); *H04L 51/32* (2013.01)

(58) Field of Classification Search
CPC ..................................................... G06F 3/0482
See application file for complete search history.

(56) References Cited

U.S. PATENT DOCUMENTS

| | | | |
|---|---|---|---|
| 6,424,711 B1 * | 7/2002 | Bayless ................. | H04M 1/575 379/355.09 |
| 7,035,923 B1 | 4/2006 | Yoakum | |

(Continued)

FOREIGN PATENT DOCUMENTS

| | | |
|---|---|---|
| CN | 101094233 | 12/2007 |
| CN | 103632332 | 3/2014 |

(Continued)

OTHER PUBLICATIONS

Gwynee, Guilford, "WeChat's little red envelopes are brilliant marketing for mobile payments," published on the internet at https://qz.com, on Jan. 29, 2014 (Year: 2014).

(Continued)

*Primary Examiner* — Nicholas Augustine
(74) *Attorney, Agent, or Firm* — Shun Yao; Park, Vaughan, Fleming & Dowler LLP.

(57) ABSTRACT

A client device displays a user interface, which includes a menu item associated with forced reminders. In response to a user selecting the menu item, the client device displays a forced-reminder user interface, which includes a content display area configured to display one or more forced-reminder messages.

20 Claims, 20 Drawing Sheets

(51) Int. Cl.
  *G06F 3/0484* (2013.01)
  *G06F 3/16* (2006.01)
  *G06F 3/01* (2006.01)

(56) References Cited

U.S. PATENT DOCUMENTS

| | | | |
|---|---|---|---|
| 7,133,687 B1 | 11/2006 | El-Fishawy | |
| 7,159,191 B2* | 1/2007 | Koivuniemi | G06F 3/0237 345/168 |
| 7,197,122 B2 | 3/2007 | Vuori | |
| 7,398,252 B2 | 7/2008 | Neofytides | |
| 7,603,413 B1 | 10/2009 | Herold | |
| 7,653,691 B2 | 1/2010 | Lasensky | |
| 7,669,134 B1* | 2/2010 | Christie | G06Q 10/107 715/758 |
| 7,835,955 B1 | 11/2010 | Brodsky | |
| 8,165,609 B2 | 4/2012 | Fang | |
| 8,316,096 B2 | 11/2012 | Svendsen | |
| 8,352,341 B1 | 1/2013 | Greenberg | |
| 8,355,699 B1 | 1/2013 | Lo | |
| 8,548,865 B1 | 10/2013 | Ho | |
| 8,670,791 B2 | 3/2014 | Ye | |
| 8,768,310 B1 | 7/2014 | Oroskar | |
| 8,769,022 B2 | 7/2014 | Tivyan | |
| 8,788,602 B1 | 7/2014 | Wan | |
| 8,843,117 B2* | 9/2014 | Sigmund | H04M 3/42153 455/413 |
| 8,856,244 B2 | 10/2014 | Madnani | |
| 8,880,725 B2 | 11/2014 | Ananthanarayanan | |
| 8,929,871 B2 | 1/2015 | Bradburn | |
| 8,968,103 B2 | 3/2015 | Zhou | |
| 9,021,040 B1 | 4/2015 | Andrews | |
| 9,117,197 B1 | 8/2015 | Sharma | |
| 9,143,477 B2 | 9/2015 | Murthy | |
| 9,185,062 B1 | 11/2015 | Yang | |
| 9,230,244 B2 | 1/2016 | Patil | |
| 9,253,639 B1 | 2/2016 | Lafuente | |
| 9,578,160 B2 | 2/2017 | Kim | |
| 9,800,525 B1* | 10/2017 | Lerner | H04L 51/36 |
| 10,021,203 B2 | 7/2018 | Papakipos | |
| 10,097,499 B1 | 10/2018 | Kumar | |
| 10,200,332 B2 | 2/2019 | Wu | |
| 10,417,037 B2 | 9/2019 | Gruber | |
| 2002/0016163 A1 | 2/2002 | Burgan | |
| 2002/0120453 A1 | 8/2002 | Lee | |
| 2003/0084109 A1 | 5/2003 | Balluff | |
| 2003/0135559 A1 | 7/2003 | Bellotti | |
| 2003/0154249 A1 | 8/2003 | Crockett | |
| 2004/0002932 A1 | 1/2004 | Horvitz | |
| 2004/0006599 A1 | 1/2004 | Bates | |
| 2004/0085360 A1* | 5/2004 | Pratt | G06F 3/0238 715/773 |
| 2004/0102962 A1 | 5/2004 | Wei | |
| 2005/0055306 A1 | 3/2005 | Miller | |
| 2005/0149855 A1 | 7/2005 | Loo | |
| 2005/0177368 A1* | 8/2005 | Odinak | H04M 3/51 704/246 |
| 2005/0193129 A1 | 9/2005 | Barlow | |
| 2006/0093142 A1 | 5/2006 | Schneier | |
| 2006/0229890 A1 | 10/2006 | Sattler | |
| 2007/0060193 A1 | 3/2007 | Kim | |
| 2007/0105572 A1 | 5/2007 | Kim | |
| 2007/0123223 A1* | 5/2007 | Letourneau | H04M 3/42161 455/414.1 |
| 2007/0233801 A1 | 10/2007 | Eren | |
| 2007/0299565 A1 | 12/2007 | Oesterling | |
| 2008/0112596 A1 | 5/2008 | Rhoads | |
| 2008/0114776 A1 | 5/2008 | Sun | |
| 2008/0168361 A1* | 7/2008 | Forstall | G06F 3/0488 715/753 |
| 2008/0168379 A1* | 7/2008 | Forstall | H04M 1/72469 715/778 |
| 2008/0307040 A1 | 12/2008 | So | |
| 2008/0307094 A1 | 12/2008 | Karonen | |
| 2009/0018903 A1 | 1/2009 | Iyer | |
| 2009/0214034 A1 | 8/2009 | Mehrotra | |
| 2009/0240497 A1 | 9/2009 | Usher | |
| 2009/0287776 A1 | 11/2009 | Corry | |
| 2010/0004971 A1 | 1/2010 | Lee | |
| 2010/0005402 A1 | 1/2010 | George | |
| 2010/0017481 A1 | 1/2010 | Chen | |
| 2010/0023341 A1* | 1/2010 | Ledbetter | G06Q 10/10 705/1.1 |
| 2010/0056109 A1 | 3/2010 | Wilson | |
| 2010/0105362 A1* | 4/2010 | Yang | H04N 21/4756 455/414.1 |
| 2010/0205541 A1 | 8/2010 | Rapaport | |
| 2010/0216448 A1 | 8/2010 | Jeon | |
| 2010/0323752 A1 | 12/2010 | Park | |
| 2011/0019662 A1 | 1/2011 | Katis | |
| 2011/0035687 A1 | 2/2011 | Katis | |
| 2011/0136431 A1 | 6/2011 | Haaramo | |
| 2011/0145823 A1 | 6/2011 | Rowe | |
| 2011/0173041 A1 | 7/2011 | Breitenbach | |
| 2011/0173548 A1 | 7/2011 | Madnani | |
| 2011/0243113 A1 | 10/2011 | Hjelm | |
| 2011/0313803 A1 | 12/2011 | Friend | |
| 2011/0314402 A1 | 12/2011 | Kikin-Gil | |
| 2012/0030301 A1 | 2/2012 | Herold | |
| 2012/0046077 A1 | 2/2012 | Kim | |
| 2012/0059842 A1 | 3/2012 | Hille-Doering | |
| 2012/0108268 A1 | 5/2012 | Lau | |
| 2012/0185547 A1 | 7/2012 | Hugg | |
| 2012/0290950 A1 | 11/2012 | Rapaport | |
| 2012/0311585 A1 | 12/2012 | Gruber | |
| 2013/0069969 A1 | 3/2013 | Chang | |
| 2013/0080580 A1 | 3/2013 | Nagai | |
| 2013/0086071 A1 | 4/2013 | Riedel | |
| 2013/0133055 A1 | 5/2013 | Ali | |
| 2013/0138726 A1 | 5/2013 | Shin | |
| 2013/0144702 A1 | 6/2013 | Tabor | |
| 2013/0173723 A1 | 7/2013 | Herold | |
| 2013/0227029 A1* | 8/2013 | Hymel | G06Q 10/107 709/206 |
| 2013/0227041 A1 | 8/2013 | Rideout | |
| 2013/0268418 A1 | 10/2013 | Sardi | |
| 2013/0268765 A1 | 10/2013 | Kent, Jr. | |
| 2013/0275164 A1 | 10/2013 | Gruber | |
| 2013/0297493 A1 | 11/2013 | Linden | |
| 2013/0298006 A1 | 11/2013 | Good | |
| 2013/0311920 A1 | 11/2013 | Koo | |
| 2013/0332162 A1* | 12/2013 | Keen | G06F 40/10 704/235 |
| 2013/0332307 A1 | 12/2013 | Linden | |
| 2014/0025546 A1 | 1/2014 | Seng | |
| 2014/0035956 A1 | 2/2014 | Hay | |
| 2014/0070945 A1 | 3/2014 | Dave | |
| 2014/0074483 A1 | 3/2014 | Van Os | |
| 2014/0101263 A1 | 4/2014 | Wu | |
| 2014/0164073 A1 | 6/2014 | Mosley | |
| 2014/0184544 A1 | 7/2014 | Lim | |
| 2014/0191986 A1 | 7/2014 | Kim | |
| 2014/0207659 A1 | 7/2014 | Erez | |
| 2014/0213318 A1 | 7/2014 | Leem | |
| 2014/0279315 A1 | 9/2014 | Courter | |
| 2014/0280615 A1 | 9/2014 | Burlin | |
| 2014/0297348 A1 | 10/2014 | Ellis | |
| 2014/0331150 A1 | 11/2014 | Griffin | |
| 2014/0372516 A1 | 12/2014 | Watte | |
| 2015/0039708 A1 | 2/2015 | Liu | |
| 2015/0081486 A1 | 3/2015 | Niazi | |
| 2015/0135046 A1 | 5/2015 | Moore | |
| 2015/0170104 A1 | 6/2015 | Yamada | |
| 2015/0207926 A1* | 7/2015 | Brown | H04M 1/72436 455/414.1 |
| 2015/0256353 A1 | 9/2015 | Busey | |
| 2015/0264303 A1 | 9/2015 | Chastney | |
| 2015/0288633 A1 | 10/2015 | Ogundokun | |
| 2015/0296450 A1 | 10/2015 | Koo | |
| 2015/0310567 A1 | 10/2015 | Wu | |
| 2015/0317590 A1 | 11/2015 | Karlson | |
| 2015/0346821 A1 | 12/2015 | Ichimura | |
| 2015/0350130 A1 | 12/2015 | Yang | |

(56) References Cited

U.S. PATENT DOCUMENTS

| | | |
|---|---|---|
| 2015/0350225 A1 | 12/2015 | Perold |
| 2016/0055215 A1* | 2/2016 | Kauwe .................. G06F 16/284 707/722 |
| 2016/0062574 A1 | 3/2016 | Anzures |
| 2016/0094509 A1 | 3/2016 | Ye |
| 2016/0125363 A1 | 5/2016 | Hung |
| 2016/0132971 A1 | 5/2016 | Teh |
| 2016/0202889 A1 | 7/2016 | Shin |
| 2016/0205049 A1 | 7/2016 | Kim |
| 2016/0227019 A1 | 8/2016 | Seol |
| 2016/0242007 A1 | 8/2016 | Mihara |
| 2016/0261532 A1 | 9/2016 | Garbin |
| 2016/0330163 A1* | 11/2016 | Le Gall .................. H04L 51/32 |
| 2017/0041255 A1 | 2/2017 | Dong |
| 2017/0118147 A1 | 4/2017 | Dold |
| 2017/0142212 A1 | 5/2017 | Bifulco |
| 2017/0171135 A1 | 6/2017 | Wu |
| 2017/0185930 A1 | 6/2017 | Perry |
| 2017/0185965 A1 | 6/2017 | Nishizawa |
| 2017/0228699 A1 | 8/2017 | Pang |
| 2017/0353423 A1 | 12/2017 | Morrison |
| 2018/0081529 A1 | 3/2018 | Zhang |
| 2018/0088784 A1 | 3/2018 | Zhu |
| 2019/0012527 A1 | 1/2019 | Wang |
| 2019/0014070 A1 | 1/2019 | Mertvetsov |

FOREIGN PATENT DOCUMENTS

| | | |
|---|---|---|
| CN | 105282328 | 1/2016 |
| CN | 105306600 | 2/2016 |
| JP | 2011059811 | 3/2011 |
| JP | 2011517380 | 6/2011 |
| JP | 2014106592 | 6/2014 |
| JP | 2014115716 | 6/2014 |
| WO | 1999037052 | 7/1999 |
| WO | 2007007330 | 1/2007 |
| WO | 2011117456 | 9/2011 |
| WO | 2014008782 | 1/2014 |
| WO | 2015017029 | 2/2015 |
| WO | 2015113458 | 8/2015 |
| WO | 2016016248 | 2/2016 |
| WO | 2016050146 | 4/2016 |
| WO | 2016054629 | 4/2016 |

OTHER PUBLICATIONS

Anonymous, "Crowdsource Your Company's Bonuses," I Done This Blog, www.blog.idonethis.com, May 30, 2012 (Year:2012).

Hao Yunhong, Qian Chen, "Decentralization and Compensation Reforms in China: The Case of Xiaoshan InterTrade," 2008 ISECS International Colloquium on Computing, Communication, Control and Management, IEEE Computer Society (Year: 2008).

Ozimec et al., "Moticational Inventives for developing salesforce performance in emerging markets," University of Zagreb, Croatia, IEEE (Year: 2011).

"Managing Activities with TVACTA: TaskVista and Activity-Centered Task Assistant", V Bellotti, JD Thornton—Proc. sigir Workshop on PIM, 2006 academia.edu (Year:2006).

* cited by examiner

COMMUNICATION AND MESSAGING SYSTEM

RELATED APPLICATION

This application is a continuation of U.S. application Ser. No. 15/040,659, entitled "NOVEL COMMUNICATION AND MESSAGING SYSTEM," by inventors Hang Chen, Zhenhao Wu, Lili Zhang, Chenlu Guo, Feng Bao, Liying Yu, Yuan Zhang, Qi Dong, Kaikai Yu, Qing Ren, Junshao Zhang, Yi Zhang, Jiarui Shi, and Jie Du, filed 10 Feb. 2016, which claims the benefit and right of priority of Chinese Patent Application No. 201510084373.6, filed 16 Feb. 2015.

BACKGROUND

Field

The present application relates to a novel communication and messaging system. More specifically, the novel messaging system allows a user to organize his contact list based on the structure of an enterprise associated with the user. In addition, the novel messaging system can be configured to allow a device to send voice reminders for a certain event to a different device.

Related Art

The rapid development of mobile technologies has fundamentally changed the ways people communicate with each other. In addition to conventional phone calls and text messages, more and more people are relying on social networking apps (e.g., Facebook® and Instagram®) to stay connected. In addition to text, many social networking apps allow users to send voice messages, pictures, and videos.

However, currently available messaging systems are often geared toward the general population and are not designed to be used in special settings (e.g., in a business or enterprise setting). In fact, most people are continuing to use the traditional email messages and telephone calls to conduct business.

SUMMARY

One embodiment of the present invention provides a system for delivering forced reminders. During operation, a client device displays a user interface, which includes a menu item associated with forced reminders. In response to a user selecting the menu item, the client device displays a forced-reminder user interface, which includes a content display area configured to display one or more forced-reminder messages.

In a variation on this embodiment, in response to the user configuring a filtering option in the forced-reminder user interface, the content display area displays at least one of: all forced-reminder messages associated with the user, one or more forced-reminder messages received by the user, one or more forced-reminder messages sent by the user, and one or more forced-reminder messages deleted by the user.

In a variation on this embodiment, displaying a respective forced-reminder message further involves: obtaining confirmation-status information associated the forced-reminder message and displaying the confirmation status information to indicate whether all, a portion of, or none of recipients of the forced-reminder message have confirmed the forced-reminder message.

In a further variation, in response to the user configuring a filtering option in the forced-reminder user interface, the content display area displays at least one of: one or more forced-reminder messages that are confirmed by all recipients, one or more forced-reminder messages that are confirmed by a portion of recipients, and one or more forced-reminder messages that have not been confirmed by any recipient.

In a variation on this embodiment, in response to the user entering a command in the forced-reminder user interface, the client device displays a forced-reminder-message-generation user interface. The forced-reminder-message-generation user interface includes an input control area, which includes at least: a recipient input control for allowing the user to specify one or more recipients of a generated forced-reminder message, a communication-channel input control for allowing the user to specify a communication channel to deliver the generated forced-reminder message, and a delivery-time control for allowing the user to specify a time to deliver the generated forced-reminder.

In a further variation, the communication channel includes one of: a telephone channel and a short-message-service (SMS) channel.

In a further variation, in response to the user specifying the communication channel as the telephone channel, the system makes a voice call to the one or more specified recipients at the specified delivery time. In response to a recipient answering the voice call, the system plays the generated forced-reminder message to the recipient.

In a further variation, the generated force-reminder message includes a system-generated audio message that is specific to a predetermined special event. The system-generated audio message is overlaid over an audio message recorded by the user.

In a further variation, the system-generate audio message includes one or more of: a holiday greeting, a birthday greeting, and an anniversary greeting.

In a variation on this embodiment, a respective forced-reminder message includes one or more of: text, emoji, graphics, audio, and video.

One embodiment provides a communication method. The method includes displaying, in response to a user inputting a command at a client device, a user interface at the client device. The user interface includes a navigation area and a content-display area. The navigation area includes at least a menu item associated with user contacts. In response to the user selecting the menu item, the user interface displays, within the content-display area a first icon representing a first contact-collection and a second icon representing a second contact-collection. The first contact-collection includes a first set of contacts having a hierarchical relationship. Contact information associated with the first set of contacts can be stored in a remote server communicating with the client device. The second contact-collection includes a second set of contacts. Contact information associated with the second set of contacts can be stored locally on the client device.

In a variation on this embodiment, the first contact-collection includes an address book of an enterprise.

In a further variation, the address book of the enterprise includes entries for a plurality of enterprise contacts. An entry of a respective enterprise contact includes one or more of: employee identification (ID) number, employee nick name, work phone number, work email address, name of a manager, name of a team, job title, and office location.

In a variation on this embodiment, the first contact-collection includes a plurality of enterprise contacts. The communication method further includes, in response to the user selecting a child department, displaying one or more enterprise contacts belonging to the child department, which involves downloading contact information associated with the one or more enterprise contacts from a remote server communicating with the client device.

In a further embodiment, the communication method further includes, in response to the user inputting a back or return command, erasing, from the client device, the contact information downloaded from the remote server.

In a variation on this embodiment, the communication method further includes, in response to the user selecting a contact from the first set of contacts, displaying detailed contact information and control options associated with the selected contact. The detailed contact information associated with the selected contact can be downloaded from a remote server communicating with the client device.

In a further variation, the displayed control options include a forced-reminder push option. The communication method further includes, in response to the user selecting the forced-reminder push option, displaying a forced-reminder user interface. The forced-reminder user interface includes content-input area that allows the user to input content using at least one of: voice, text, video, and graphics.

In a further variation, the content includes content inputted by the user and content stored at the client device.

In a further variation, the communication method further includes, in response to the user selecting the forced-reminder push option, displaying a forced-reminder user interface. The forced-reminder user interface includes a sending-option-input area, which includes a recipient-input control, a delivery-method control, and a deliver-timing control. The delivery method can include phone calls and simple message service (SMS) messages. The delivery time can be set based on an input from the user.

In a variation on this embodiment, the second contact-collection includes an address book associated with the client device. The communication method further includes, in response to the user selecting the second icon, displaying a plurality of contacts associated with the client device and their detailed contact information.

In a further variation, in response to a contact in the address book being a client-side friend of the user, displaying a visual indicator for the contact in the address book.

In a further variation, the second contact-collection includes a plurality of client-side friends.

In a further variation, the communication method further includes, in response to the user selecting a contact from the second set of contacts, displaying detailed contact information and control options associated with the selected contact. If the selected contact is both a client-side friend and an enterprise contact, information associated with the enterprise contact has priority to be included in the displayed detailed contact information.

In a variation on this embodiment, the communication method further comprising, in response to the user selecting the menu item, the user interface displays, within the content-display area a third icon representing a third contact-collection. The third contact-collection includes client-side friends of the user.

In a further variation, the communication method further includes, in response to the user selecting a contact from the third contact-collection, displaying detailed contact information and control options associated with the selected contact. If the selected contact is both a client-side friend and an enterprise contact, information associated with the enterprise contact has priority to be included in the displayed detailed contact information.

In a variation on this embodiment, the second contact-collection includes user groups.

In a further variation, the communication method further includes, in response to the user selecting a group from the second contact-collection, displaying detailed information associated with the selected group.

In a further variation, the communication method further includes, in response to the user initializing a conference call within the group, making voice calls to at least a subset of group members.

In a variation on this embodiment, the communication method further includes, in response to the user selecting the menu item, the user interface displays, within the content-display area a fourth icon representing a fourth contact-collection. The fourth contact-collection includes historical contacts.

In a further variation, the communication method further includes displaying, in a descending order, the historical contacts based on their contact frequencies.

In a further variation, the communication method further includes, in response to a historical contact being an enterprise contact, displaying a thumbnail visual icon and the name of the historical contact. The displayed thumbnail visual icon includes initials of the name of historical contact.

In a variation on this embodiment, the client device includes at least one of: a cell phone, a smart phone, a tablet computer, a wearable computer.

In a variation on this embodiment, the user interface is displayed by a client-side module installed on the client machine.

One embodiment provides a communication apparatus. The communication apparatus includes a first processing unit and a second processing unit. The first processing unit is configured to display, in response to a user inputting a command at a client device, a user interface at the client device. The user interface includes a navigation area and a content-display area. The navigation area includes at least a menu item associated with user contacts. The second processing unit is configured to display, in response to the user selecting the menu item, within the content-display area a first icon representing a first contact-collection and a second icon representing a second contact-collection. The first contact-collection includes a first set of contacts having a hierarchical relationship. Contact information associated with the first set of contacts can be stored in a remote server communicating with the client device. The second contact-collection includes a second set of contacts. Contact information associated with the second set of contacts can be stored locally on the client device.

In a variation on this embodiment, the first contact-collection includes a plurality of enterprise contacts. The communication apparatus further includes a third processing unit configured to, in response to the user selecting a child department, display one or more enterprise contacts belonging to the child department, which involves downloading contact information associated with the one or more enterprise contacts from a remote server communicating with the client device.

In a variation on this embodiment, the communication apparatus further includes an erasing mechanism configured to erase, from the client device, the contact information downloaded from the remote server in response to the user inputting a back or return command.

One embodiment of the present invention provides a portable computing device. The device includes a display, a processor, and a memory. The memory can be configured to store a client-side program that when executed by the processor causing the portable computing device to perform a method. The method includes display, in response to a user inputting a command at a client device, a user interface at the display. The user interface includes a navigation area and a content-display area. The navigation area includes at least a menu item associated with user contacts. In response to the user selecting the menu item, the user interface displays, within the content-display area a first icon representing a first contact-collection and a second icon representing a second contact-collection. The first contact-collection includes a first set of contacts having a hierarchical relationship. Contact information associated with the first set of contacts can be stored in a remote server communicating with the client device. The second contact-collection includes a second set of contacts. Contact information associated with the second set of contacts can be stored locally on the client device.

In a variation on this embodiment, the user interface further includes a contact-shortcut button. In response to the user tapping the contact-shortcut button, the user interface displays at least one of the following contact-shortcut functions: instant messaging, adding a friend to a friend list, and creating a group.

In a variation on this embodiment, the display is a touchscreen display. In response to receiving a gesture from user to turn a page, the user interface hides the contact-shortcut button.

One embodiment of the present invention provides a portable computing device. The device includes a display, a processor, and a memory. The memory can be configured to store a client-side program that when executed by the processor causing the portable computing device to perform a method. The method includes display, in response to a user inputting a command at a client device, a user interface at the display. The user interface includes a navigation area and a content-display area. The navigation area includes a menu item associated with user contacts and a menu item associated with forced-reminders. In response to the user selecting the menu item associated with user contacts, the user interface displays, within the content-display area a first icon representing a first contact-collection and a second icon representing a second contact-collection. The first contact-collection includes a first set of contacts having a hierarchical relationship. Contact information associated with the first set of contacts can be stored in a remote server communicating with the client device. The second contact-collection includes a second set of contacts. Contact information associated with the second set of contacts can be stored locally on the client device. A respective contact from the first and second sets of contacts can be selected to send a forced reminder. In response to the user selecting the menu item associated with forced reminders, the user interface displays, within the content-display area, at least a portion of the to-be-sent forced reminder.

One embodiment of the present invention provides a server configured to communicate with a first portable terminal device and a second portable terminal device. The server includes a processor and a memory. The memory can be configured to store a forced-reminder-processing program that when executed by the processor causing the server to perform a method. The method includes receiving, from the first portable terminal device, a forced-reminder message associated with a special event; overlay on the received forced-reminder message information associated with the special event to obtain a combined forced-reminder message; making a voice call, via a voice-communication network, to the second portable terminal device; and in response to the second portable terminal device accepting the voice call, playing the combined force-reminder message at the second portable terminal device.

One embodiment of the present invention provides a communication method. The method includes sending a conference-call request that includes a plurality of contacts; uploading contact information associated with the plurality of contacts to a server; and receiving, from the server, a voice-call request responsive of the conference-call request. The method further includes generating conference-call control interface in response to receiving an operation command form the user. The conference-call control interface displays icons associated with the plurality of contacts. The method also includes controlling the conference call via the conference-call control interface.

In a variation on this embodiment, the method further includes, in response to receiving a call response from a contact, modifying the display status of an icon corresponding to the contact.

In a variation on this embodiment, the conference-call control interface further includes a menu item for adding participants. During the conference call, a user can select the menu item to send a request to the server to add a new participant to the conference call. The conference-call control interface can be configured to, in response to the request to add the new participant, display an additional icon corresponding to the new participant.

In a variation on this embodiment, the uploaded contact information includes names of the contacts.

In a variation on this embodiment, the uploaded contact information includes wireless phone numbers of the contacts.

In a variation on this embodiment, the uploaded contact information includes a group identifier.

In a variation on this embodiment, the conference-call control interface includes one or more controls associated with the contacts. A respective control can be configured to modify, in response to a user inputting a command to select a contact, displaying a status-control button for the selected contact.

In a further variation, the status-control button includes a mute button. The method further includes, in response to the user tapping the mute button of the selected contact, sending a request to the server to block the voice of the selected contact.

In a further variation, the method further includes updating, in response to a feedback from the server to the request, the communication status of the selected contact.

One embodiment of the present invention provides a communication method. The method includes receiving, from a client device, a request to establish a conference call, establishing the conference call, and determining participants to the conference based on the received request. The method further includes sending a voice-call request to the determined participants, connecting the communication paths of the participants, receiving voice signals from participants accepting the voice-call request via the connected communication path, and sending the voice signals to the participants accepting the voice-call request.

In a variation on this embodiment, receiving the request to establish a conference call involves the Internet Protocol (IP).

In a variation on this embodiment, the request includes names of the participants. Determining the participants involves querying the contact-information database for wireless phone numbers based on the names of the participants. Sending the voice-call request involves sending the voice-call request directed to a wireless phone number via a cellular network associated with the wireless phone number.

In a variation on this embodiment, the request includes a group identifier. Determining the participants involves querying the contact-information database for wireless phone numbers of member of the group based on the group identifier. Sending the voice-call request involves sending the voice-call request directed to a wireless phone number via a cellular network associated with the wireless phone number.

In a variation on this embodiment, the request includes wireless phone numbers of the participants.

One embodiment of the present invention provides a communication system. The system includes a conference-call management module and a communication-path exchange module. The conference-call management module is configured to receive a conference-call request from a user, establishing a conference-call room based on the received request, and assigning an identifier for the conference-call room. The communication-path exchange module is configured to send a voice-call request to participants of the conference call and route the communication path to all participants.

In a variation on this embodiment, the communication-path exchange module is configured to, in response to receiving from a third user a call request with the assigned identifier, route the communication path to the third user.

In a variation on this embodiment, the conference-call management module is configured to set a first control authority for the user sending the conference-call request and return the first control authority to the user.

One embodiment of the present invention provides a communication method within a group. The method includes receiving a request to establish a group that includes one or more members; receiving, via an IP channel, a voice-call request from a first user directed to a second user; determining whether the first and second users belonging to the group; in response to the first and second users belonging to the group, making a voice call to both the first and second users via communication networks corresponding to the first and second users, respectively; and in response to receiving a voice-call response from the first and second users, establishing a voice-communication path between the first and second users.

In a variation on this embodiment, the request to establish the group includes characteristic information associated with members of the group. The method further includes displaying characteristic information associated with the first user to the second user.

In a variation on this embodiment, the method further includes, in response to a user command, limiting a competence-authority of at least one group member; determining whether the second user has the limited competence-authority; and in response to the second user having the limited competence-authority, rejecting the voice-call request from the first user.

One embodiment of the present invention provides a method for sending a reminder associated with a user message within a social network. The method includes receiving the user message from a user and a reminder event specific to the user message, sending the user message to other users or user group specified by the user, and receiving feedback to the user message from the other users and the user group. The method further includes determining, based on the received feedback whether the reminder event is triggered; in response to determining that the reminder event being triggered, call a call agent to send a voice-call request to a user or user group corresponding to the feedback that triggers the reminder event; and in response to the corresponded user or user group answering the voice-call request, playing the user message.

In a variation on this embodiment, the reminder event includes the importance level defined by the user associated with the user message. The importance level corresponds to a predetermined time threshold. Determining whether the feedback from other users or user group triggers the reminder event involves determining whether a confirmation message associated with the user message is received within a predetermined time threshold corresponding to the importance level of the user message.

One embodiment of the present invention provides a method for communicating with different types of client devices within a social network. The method includes receiving, from a main caller via a first network, a request to establish a voice call with at least one client device of a different type; establishing the voice call which involves determining participating client devices of the voice call; sending, via a second network, a voice-call request to the participating client devices; establishing voice-communication paths among the participating client devices; and sending voice signals from participating client devices to other client devices responding to the voice-call request.

In a variation on this embodiment, the second network is determined based on the type of the participating client devices.

In a further variation, the participating client devices include one or more of: a Global System for Mobile (GSM)-compliant device, a code-division multiple-access (CDMA)-compliant device, a time-division synchronous CDMA (TD-SCDMA)-compliant device, a WCDMA-compliant device, a time-division long-term-evolution (TD-LTE)-compliant device, and a frequency-division-LTE (FDD-LTE)-compliant device.

In a variation on this embodiment, the first network includes a cellular communication network or a WiFi® network.

In a variation on this embodiment, the second network includes a public switched telephone network (PSTN).

One embodiment of the present invention provides a computer-executable method for interacting over a network. The method includes, in response to receiving from a user of a computer a command, displaying a user interface, which includes a plurality of contact lists. A first contact list includes a plurality of first members. The user interface is configured to limit the edit authority of the user such that the user cannot edit contact information associated the first members. A second contact list includes a plurality of second members. The user interface is configured to grant edit authority to the user such that the user can edit contact information associated the second members. The method further includes allowing interactions among users over the network in response to a user from a first or second contact list sending an interaction command.

In a variation on this embodiment, the first or second contact list includes one of: a social network group, a club, an enterprise, a friend group, a hobby group, a schoolmate group, etc.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention provide a novel messaging system that can be used in a business or enterprise setting. More specifically, the messaging system allows employees of a large company to communicate with each other in a secure and efficient manner. The messaging system allows the users to organize a contact list and establish various user groups based on the organization hierarchy of the company. In addition to text messages, the messaging system allows users to send audio and video messages. In some embodiments, the messaging system can generate forced reminders (referred to as "Ding" messages) and send such "Ding" messages to users. A "Ding" message can include text, emoji, audio, and video messages. The messaging system can also provide a user interface to allow the user to configure the way the "Ding" message is sent.

Novel Messaging System

Figure 1:
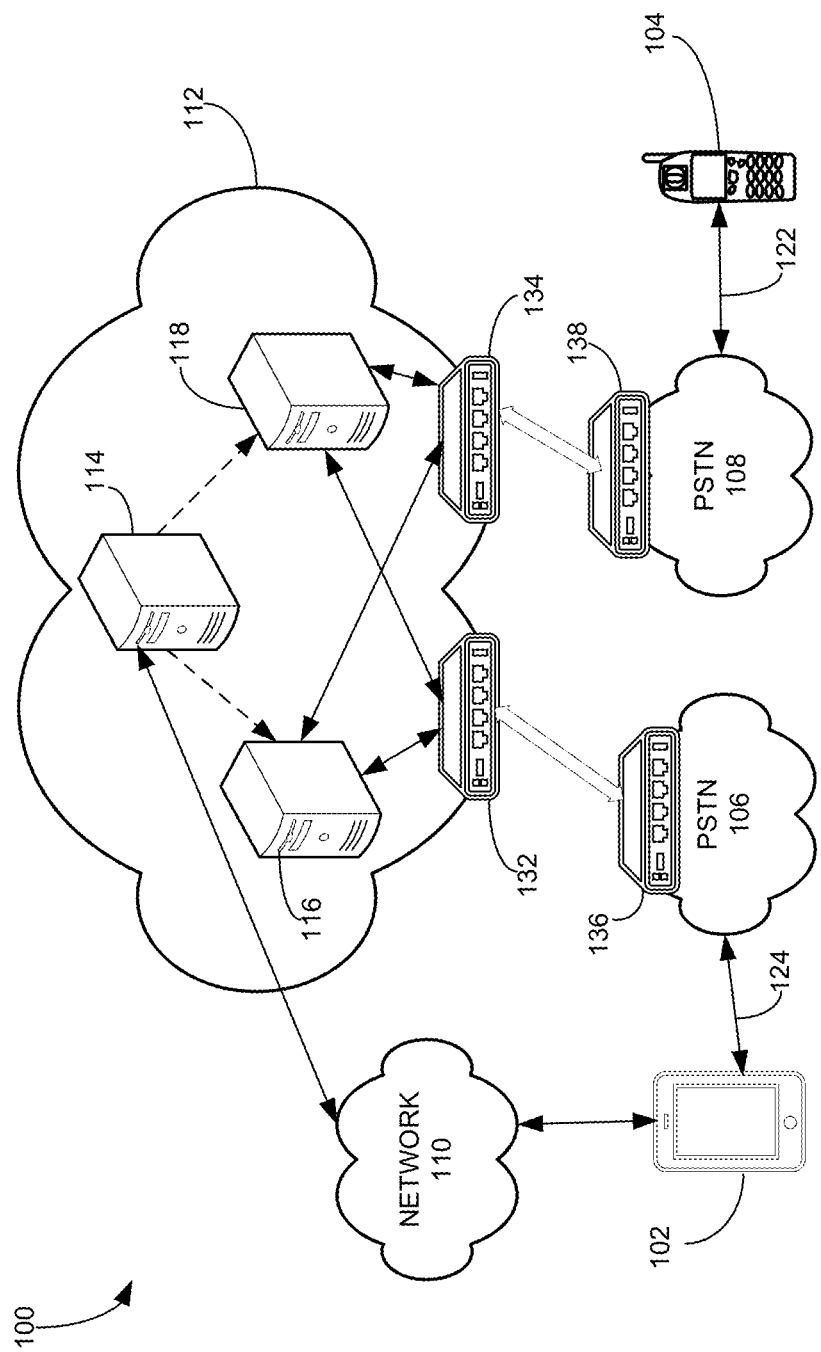
FIG. 1 presents a diagram illustrating an exemplary communication system, according to an embodiment of the present invention.

FIG. 1 presents a diagram illustrating an exemplary communication system, according to an embodiment of the present invention. In FIG. 1, communication system 100 includes a number of client devices (e.g., devices 102 and 104), a number of networks (e.g., networks 106, 108, and 110), and a server 112. The client devices can include computing devices that can enable voice communication or other types of communication over a network, including but not limited to: desktop computers, laptop computers, tablet computers, personal digital assistants (PDAs), mobile phones, smartphones, game consoles, wearable devices (e.g., smartglasses and smartwatches), etc. Moreover, the client devices can include but are not limited to: a Global System for Mobile (GSM)-compliant device, a code-division multiple-access (CDMA)-compliant device, a time-division synchronous CDMA (TD-SCDMA)-compliant device, a WCDMA-compliant device, a time-division long-term-evolution (TD-LTE)-compliant device, and a frequency-division-LTE (FDD-LTE)-compliant device. Although FIG. 1 shows two client devices, the number of client devices included in communication system 100 is not limited to two. If a client device is the recipient of a communication, the client device can be a device that does not install the client-side program. For example, a regular mobile phone (e.g., mobile phone 104) can be a recipient of a communication initiated by a smartphone (e.g., smartphone 102).

The networks can include various types of wired or wireless networks, such as the public switched telephone network (PSTN) and the Internet. In FIG. 1, networks 106 and 108 can include PSTN, and network 110 can include other types of networks, such as Wi-Fi® networks or cellular networks. During operation, client devices 102 and 104 can communicate with each other via one or more of the networks. If a client device does not have the client-side program installed (e.g., mobile phone 104), it may need to communicate with other client devices and server 112 via a cellular network 122, which can implement various communication standards, including but not limited to: code-division multiple-access (CDMA), Global System for Mobile (GSM), wideband-CDMA (WCDMA), time-division synchronous CDMA (TD-SCDMA), etc. If a client device does have the client-side program installed (e.g., smartphone 102), the client device can communicate with other client devices and server 112 via network 110. At the same time, smartphone 102 can connect to PSTN 106 via a cellular network 124 for voice communications.

Server 112 can be a physical server that includes a standalone computer, a virtual server provided by a cluster of standalone computers, or a cloud server. In some embodiments, depending on the functions provided by communication system 100, server 112 can include business server 114 and exchange servers 116 and 118, as shown in FIG. 1. Business server 114 can connect to PSTN 106 and PSTN 108 via exchange servers 116 and 118 and the corresponding gateways (e.g., gateways 132, 134, 136, and 138). For example, when client device 102 attempts to send a message (e.g., a "Ding" message) to client device 104, it can send the message to business server 114 via network 110. Business server 114 can then send instructions to exchange server 116 or 118, instructing exchange server 116 or 118 to send a voice call to client device 104. Upon client device 104 accepting the voice call, business server 114 causes the "Ding" message to be played on client device 104 to the user. If the "Ding" message includes an audio message, it can be directly played to the user on client device 104. In certain scenarios, the "Ding" message can include a text message, and business server 114 can convert the text message to an audio message and send such audio message to client device 104 to be played.

During operation, a user can enter a user command in a client device to start the messaging application on the client device. In some embodiments, the user can enter the user command manually. For example, the user can tap an icon corresponding to the messaging application on the touchscreen of the client device to initiate the messaging application. The user interface displayed on the touchscreen can include a screen displaying a list of apps, the lock screen, the main start screen, etc. Alternatively, a user can go to the system setting to tap on a notification associated with the messaging application to start the messaging application.

In this disclosure, for exemplary purposes, the client device is a smartphone and the user interface for the messaging system includes a touchscreen that allows a user to input user commands (e.g., making menu selections) by tapping on the touchscreen or performing a gesture on the touchscreen. In practice, other types of user interface are also possible, as long as a user can enter commands through the user interface. For example, if the client device is a desktop computer that does not have a touchscreen, a user may input user commands via a keyboard or a computer mouse.

Figure 2:
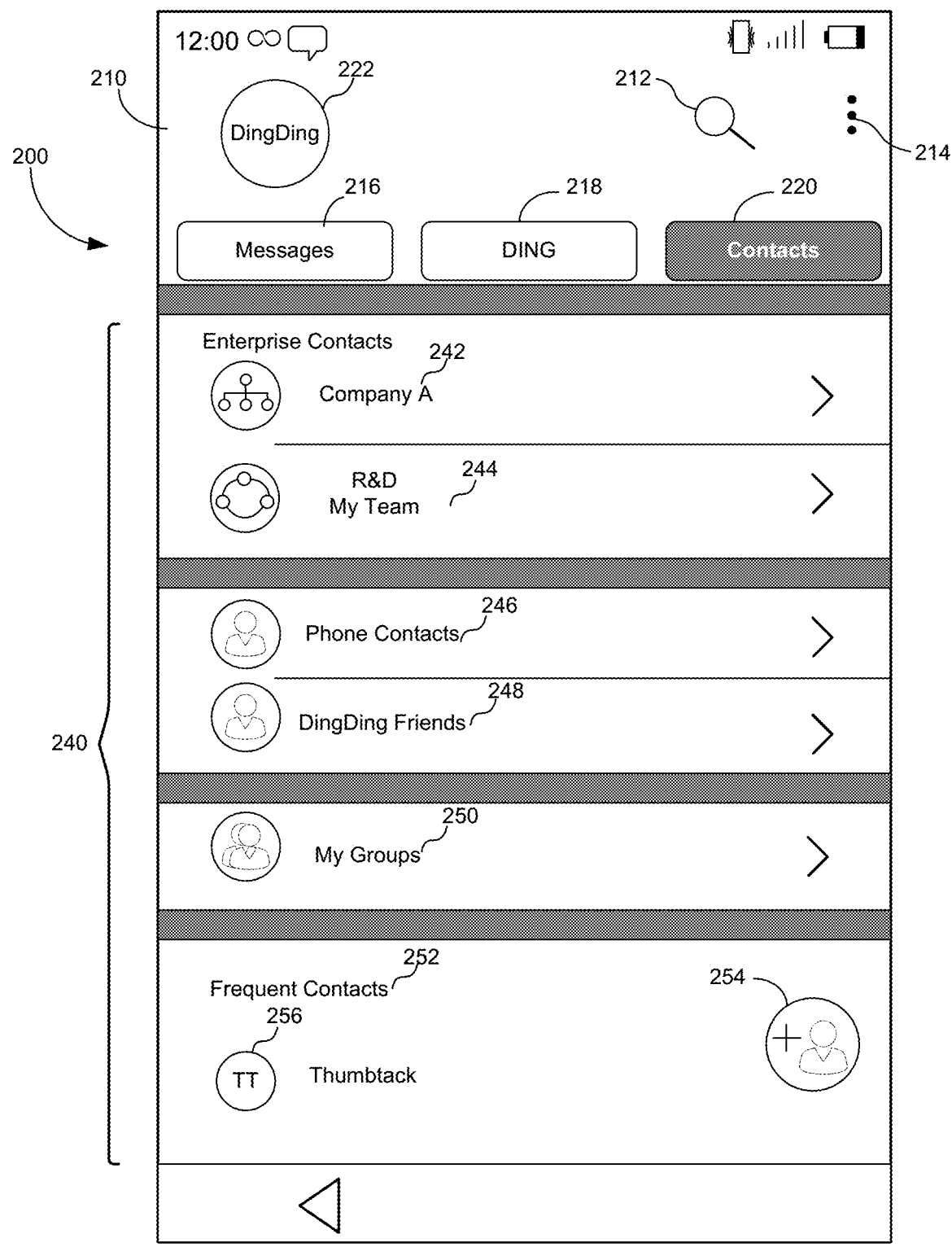
FIG. 2 presents a diagram illustrating an initial user interface for the messaging system, according to an embodiment of the present invention.

FIG. 2 presents a diagram illustrating an initial user interface for the messaging system, according to an embodiment of the present invention. In some embodiments, after a user logs into his account from a client device (e.g., a smartphone), a main page 200 can be displayed on the client device. In some embodiments, main page 200 can include a navigation area 210 and a content-display area 240. In the example shown in FIG. 2, navigation area 210 is located at the top of main page 200, closer to the system-status display area (which displays the time, connectivity, battery life, etc.). Content-display area 240 is located in the lower part of main page 200. The configuration of main page 200, including the placement of navigation area 210 and content-display area 240 can change. For example, it is also possible to have navigation area 210 located at the bottom and content-display area 240 located at the top of main page 200.

Navigation area 210 can include a number of selectable icons, such as a search icon 212, a more-option icon 214, a messages icon 216, a DING icon 218, and a contacts icon 220. Navigation area 210 can also optionally display the logo of the messaging system, such as logo 222. Content-display area 240 displays content associated with the icon selected in navigation area 210. In the example shown in FIG. 2, contacts icon 220 is selected (as indicated by it being shaded), and content-display area 240 displays various types of contact information, which are divided into a number of panels.

One panel can display enterprise contacts, organized into a company-wide contact list 242 and a team contact list 244. Other panels can display the user's phone contact list 246, friend or buddy list 248, groups list 250, and a frequent contact list 252. A clickable button 254 allows the user to add new contacts or create new groups.

Enterprise contacts include contacts that have hierarchical relationship, such as employees of a company or members of an organization. In the example shown in FIG. 2, company-wide contact list 242 includes a single entry: Company A, which is a collection of all employees of Company A. Similarly, team contact list 244 includes a single entry: R&D, which is a collection of all members of team R&D. In some embodiments, enterprise contacts (including the company-wide contacts and the team contacts) are obtained from the server of the messaging system. When the current user selects an enterprise contact, the contact information (e.g., the address book) of that particular enterprise contact can be downloaded from the server to the client device.

Phone contacts list 246 typically includes contacts that are stored locally on the client device (e.g., a smartphone). If the current user selects phone contact list 246, the client device can display the contact information associated with each individual contact. In the event that an individual contact in phone contacts list 246 is also a friend within the messaging system of the current user, a special indicator can be displayed next to the name of the individual contact to indicate such special relationship. In some embodiments, the current user can communicate, using the messaging system, with any local contacts. Such communication can include sending instant messages (e.g., text, emoji, graphics, audio, and video messages), sending "Ding" messages, and/or making voice calls.

Friend list 248 typically includes the current user's list of friends within the messaging system. Both phone contacts and friends can be viewed as local contacts, because these contact information are stored in the local client device. In certain situations, a "friend" in the messaging system may also belong to an Enterprise contact. For example, a "friend" of the current user may also be a member of Company A. In such a situation, the enterprise contact has display priority. In other words, contact information of the "friend" will be displayed based on his affiliation with Company A.

Group list 250 typically includes communication groups (e.g., a chat group) to which the current user subscribed to. The groups can include any types of groups, e.g., family, friends, and colleagues. The current user can enter any group by tapping the entry corresponding to the group. In some embodiments, the system can display detailed information associated with a group (e.g., a list of the group member) in response to the current user selecting the group. The current user can enter any group in group list 250 to start instant group chat and send messages. In some embodiments, the current user can start a conference call with all or a subset of members of a group.

Frequent contact list 252 typically includes contacts that have communicated with the current user in the past. In some embodiments, the contacts can be ranked based on the frequencies that they communicate with the current user. The highest ranked member is displayed on the top of the list. In the example shown in FIG. 2, frequent contact list 252 includes one entry: Thumbtack. In some embodiments, the user can set the number of frequent contacts included in frequent contact list 252. Frequent contact list 252 can serve as a shortcut to allow the current user to initialize communication by tapping an entry in frequent contact list 252 without going to other sub-menus. In some embodiments, if a frequent contact belongs to an enterprise contact (e.g., Thumbtack may belongs to Company A), the system displays a thumbnail visual symbol and the name (instead of the nickname) of the frequent contact. The thumbnail visual symbol (e.g., thumbnail 256) can include initials of the individual contact's name.

Figure 3:
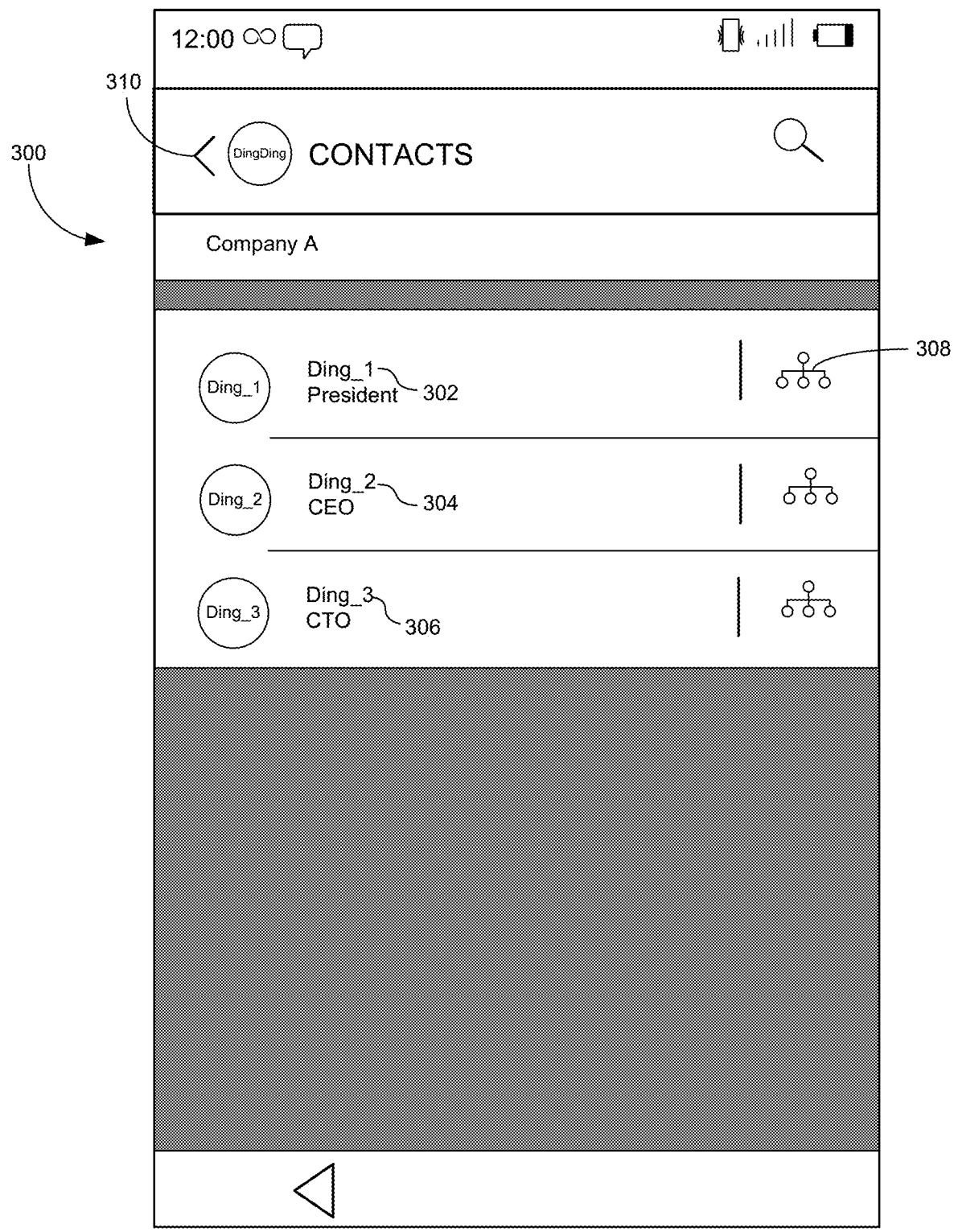
FIG. 3 presents a diagram illustrating a submenu page for the messaging system, according to an embodiment of the present invention.

In some embodiments, the system can organize Enterprise contacts based on the organization hierarchy of a company. For example, when the user selects entry 242, which is the top-level menu for contacts in Company A, a new page will be displayed. FIG. 3 presents a diagram illustrating a submenu page for the messaging system, according to an embodiment of the present invention. In FIG. 3, page 300 lists the top-level organization contacts, according to the organization hierarchy, of Company A. For example, selectable icons 302, 304, and 306 represent the President (Ding_1), the CEO (Ding_2), and the CTO (Ding_3), respectively, of Company A. Note that these entities are marked as organizations or teams, as indicated by an organization/team symbol (e.g., symbol 308). When a user clicks on one of the icons, a different page will be displayed to show the next level contacts. In the example shown in FIG. 3, all entities listed on page 300 are organizations. In practice, it is also possible for this top-level menu to include one or one entries representing individuals within Company A, such as individual customer-contact representatives. A user can tap an icon representing a particular customer-contact representative to view detailed information regarding that customer-contact representative.

The organization's contacts (e.g., icons 302, 304, and 306) can be obtained from the server communicating with the client device. In some embodiments, contacts obtained from the server can be stored in a local storage device coupled to the client device. For example, such information can be stored in the memory (including volatile or non-volatile memories) or the hard drive of the client device, or it can be stored in a flash memory (e.g., secure digital (SD) memory card) coupled to the client device. In some embodiments, the address book of an entire organization can be maintained by the server or can be stored in a storage device. When the current user selects a particular level of the organization hierarchy, contact information of members in that level will be sent from the server to the client device. Note that, because the contact information of the enterprise contacts are maintained by the server, the current user typically does not have authority to make changes to the enterprise contacts.

Page 300 can also include a back button 310. A user can activate back button 310 (e.g., by tapping on back button 310) to return from current page 300 to main page 200. In some embodiments, once back button 310 is activated, contact information displayed on page 300, including the top-level organization contacts 302-306, will be erased from the local memory. Because the organization contacts are maintained at the server, erasing the local copy prevent any possible information conflict.

Figure 4:
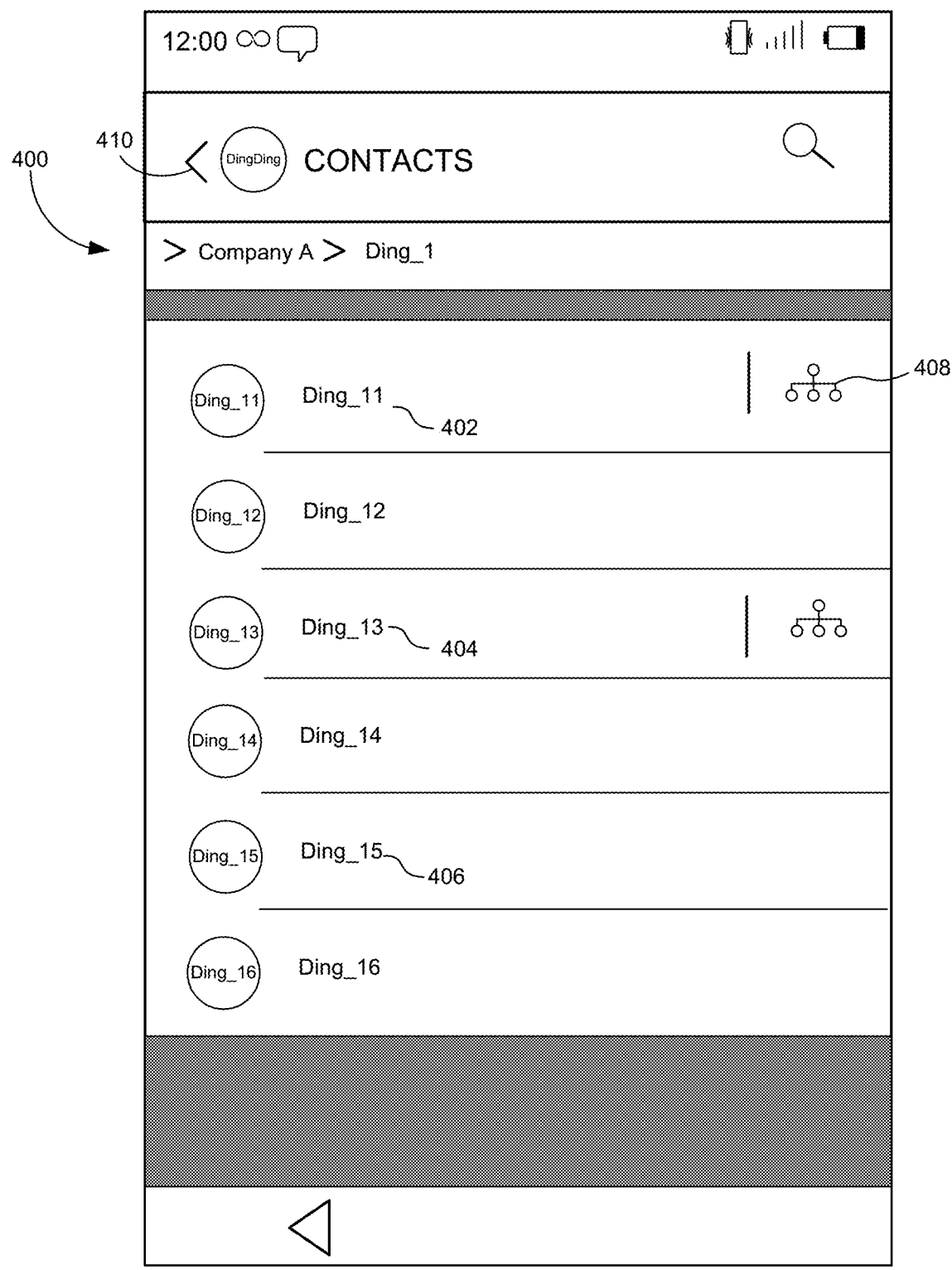
FIG. 4 presents a diagram illustrating a submenu page for the messaging system, according to an embodiment of the present invention.

As discussed previously, a user can click on a contact icon shown in FIG. 3 to see detailed information (e.g., the next level contacts) of the corresponding organization contact. For example, if a user has selected Ding_1 (icon 302), a page will be displayed listing individuals or groups (departments) under Ding_1 based on the organization hierarchy of Company A. FIG. 4 presents a diagram illustrating a submenu page for the messaging system, according to an embodiment of the present invention. More specifically, FIG. 4 shows a page 400 that is displayed on the client device in response to a user selecting a top-level organization contact Ding_1. Page 400 lists a number of contacts under Ding_1, such as contacts 402, 404, and 406. Page 400 can also include a back button 410 for returning to previous page 300.

In the example shown in FIG. 4, certain contacts listed on page 400 are organization contacts (e.g., contacts 402 and 404), as indicated by the organization/team symbols displayed next to the entries. An organization/department symbol (e.g., symbol 408) displayed next to a contact entry indicates that one or more lower-level contacts exist. Certain contacts listed on page 400 are individuals, such as contact 406. When a user selects a particular individual, a new page will be displayed to show detailed contact information associated with the selected individual. Similar to page 300, information displayed on page 400 can be obtained from the server of the messaging system. When the current user taps back button 410, information displayed on page 400 will be erased from the local memory. This way, each time the current user access the organization contact page, the server will send most up-to-date information to the client device.

Figure 5:
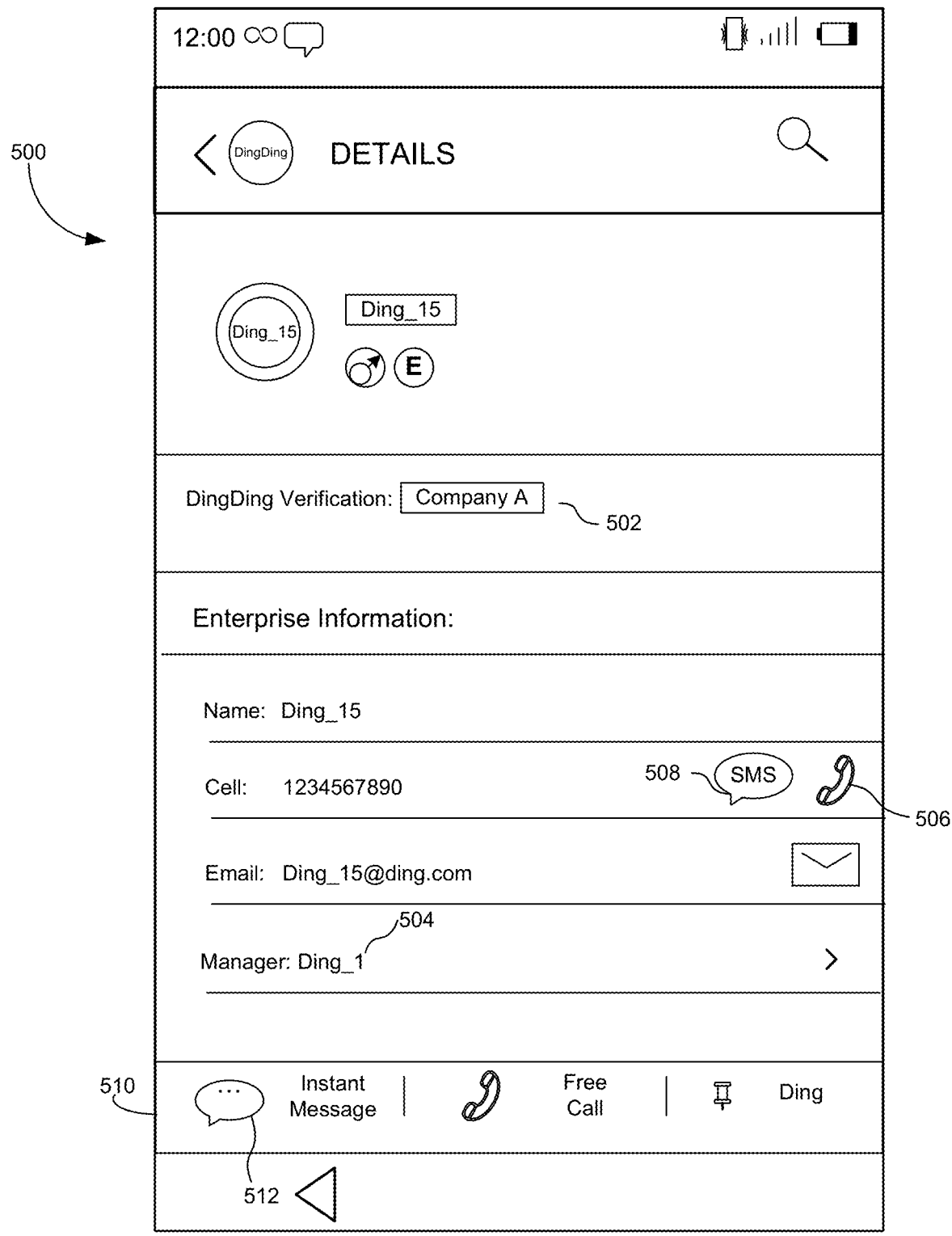
FIG. 5 presents a diagram illustrating a submenu page for the messaging system, according to an embodiment of the present invention.

FIG. 5 presents a diagram illustrating a submenu page for the messaging system, according to an embodiment of the present invention. More specifically, FIG. 5 shows a page 500 that is displayed on the client device in response to a user selecting a particular individual in a contact page. In FIG. 5, page 500 shows detailed enterprise information associated with an individual Ding_15, including his name, phone number, email address, etc. A special entry 502 also indicates that the enterprise affiliation of this individual has been verified. In other words, the system has verified that individual Ding_15 is, indeed, an employee of Company A. In addition to the standard contact information, such as phone number and email address, associated with an individual, page 500 also lists the manager of the individual using entry 504. This allows a customer or a business collaborator of Company A, or another employee of Company A, to contact Ding_15's manager when needed. For example, a user can expand entry 504 to view details regarding the manager. The manager here is the upper-level contact, which can be an organization contact or a person. Other enterprise information that can be displayed in page 500 can include but are not limited to: employee number, employee nick name, work phone number, work email address, name of the manager, team affiliation within the company, job title, office location, etc.

As discussed previously, the enterprise information displayed on page 500 has been verified by the system, and the enterprise information is maintained at the server. Hence, different from a conventional address book that allows the current user to edit the contact information, the enterprise information displayed on page 500 cannot be edited by the current user. In other words, the users do not have authority to make changes to the remote contacts.

Page 500 also includes various selectable icons to allow the user to initialize other types of communication (e.g., text messages, phone calls, emails). For example, a click on icon 506 can cause the system to call the corresponding phone number, and a click on icon 508 can cause the system to send a text message to that number.

Page 500 can also include a communication panel 510 for allowing the user to communicate with the individual contact (Ding_15) through various communication channels, such as instant messages, phone calls, and Ding messages. In some embodiments, the messaging system can provide free phone services to the user. For example, a user may make free calls to any phone number for up to a certain number of minutes per day or per week. Such phone calls can be routed through the communication server of the messaging system and do not incur any cost to the user.

Figure 6:
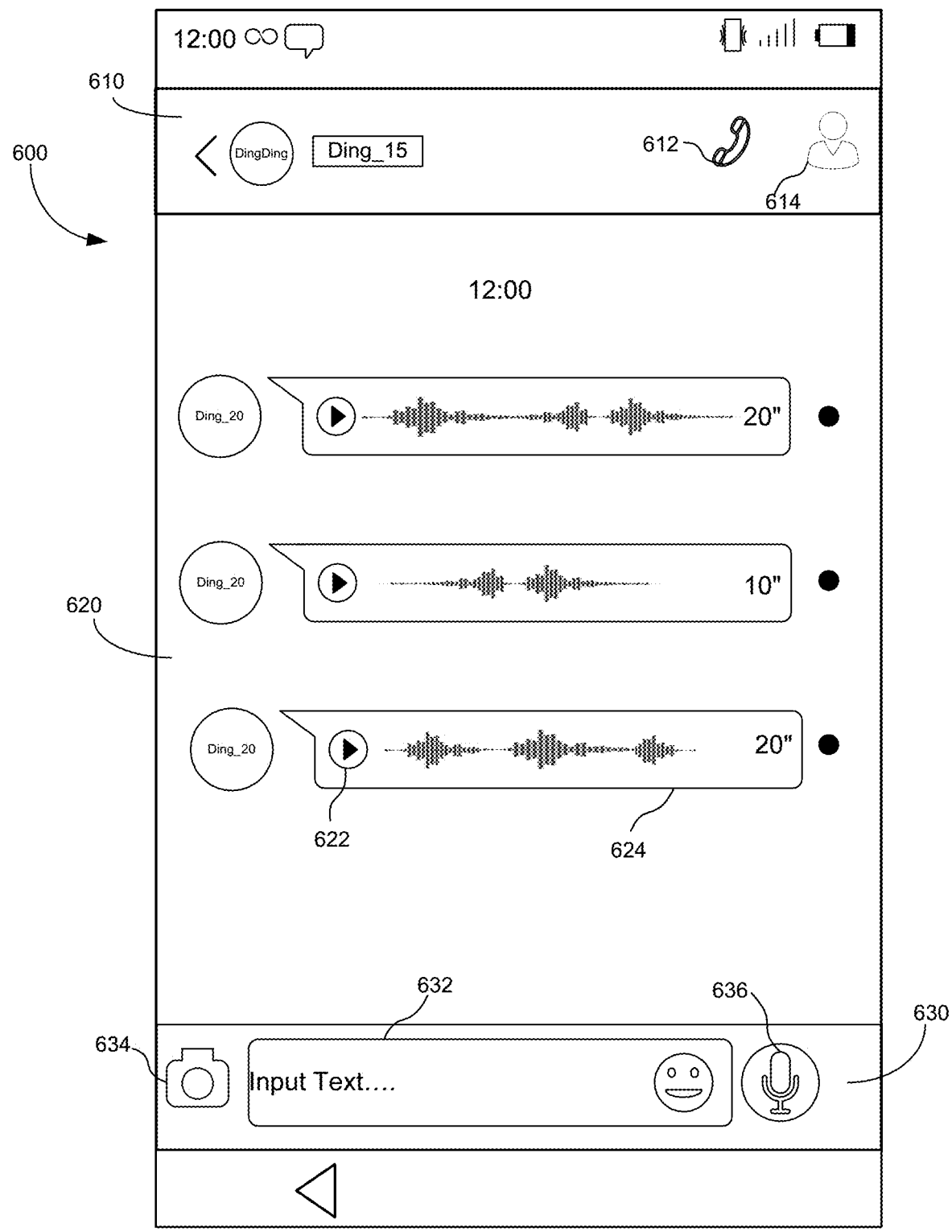
FIG. 6 presents a diagram illustrating an exemplary message page, in accordance with an embodiment of the present invention.

When a user selects instant message icon 512, a message page will be displayed to allow the user to send instant messages to the individual contact listed in page 500, i.e., Ding_15. FIG. 6 presents a diagram illustrating an exemplary message page, in accordance with an embodiment of the present invention. In FIG. 6, page 600 includes a control area 610, a message-display area 620, and a message-input area 630.

Control area 610 indicates a particular enterprise individual contact (Ding_15 in this example) and one or more control options. A phone icon 612 allows the current user to quickly initialize a phone call to the individual contact without leaving the message page (page 600), and a user icon 614 allows the current user to view the profile of the individual contact.

Message-display area 620 displays messages sent from the particular individual contact to the current user. The messages can include text, emoji, graphics, audio, and/or video messages. In the example shown in FIG. 6, message display area 620 displays a number of audio messages. The current user can tap the "play" icon embedded in a message entry to replay the message. For example, by taping icon 622 embedded in message 624, the current user can play message 624. In some embodiments, once the current user has opened a message (e.g., played an audio message), the message system can send, via the system server, a confirmation message back to the particular individual contact who sent the message. For example, once the current user has played audio message 624, a confirmation message will be sent back to individual contact Ding_15, notifying Ding_15 that the message recipient has opened or read the message. In some embodiments, the client device of Ding_15 can update the status of the message from "unread" to "read."

Message-input area 630 includes a number of input controls. Text-input control 632 allows the current user to enter text messages, and camera-input control 634 can be used to start the camera equipped on the client device to allow the user to shoot a picture or a video clip and include the picture or video clip in the message. Message-input area 630 further includes an audio-input control 636, which allows the user to send an audio clip, such as a voice message. In the example shown in FIG. 6, audio-input control 636 is located at the lower right corner of page 600. In practice, audio-input control 636 can be located anywhere in page 600 or can be temporarily hidden. In some embodiments, the current user can press and hold audio-input control 636 to start the voice-input operation, and stop the voice-input operation by releasing audio-input control 636. In some embodiments, while the current user is recording an audio message, the duration and/or waveform of the recorded audio message can be displayed in real time in message-input area 630. For example, when the current user presses and holds audio-input control 636, text-input control 632 disappears and the waveform of the recorded audio message is displayed. The current user can choose to send the audio message instantly by releasing audio-input control 636. Alternatively, the current user may want to listen to and edit the recorded audio message before sending it out. In some embodiments, the system can allow the current user to use a hand gesture to indicate his intention to view and edit the recorded audio message before sending the message.

Figure 7:
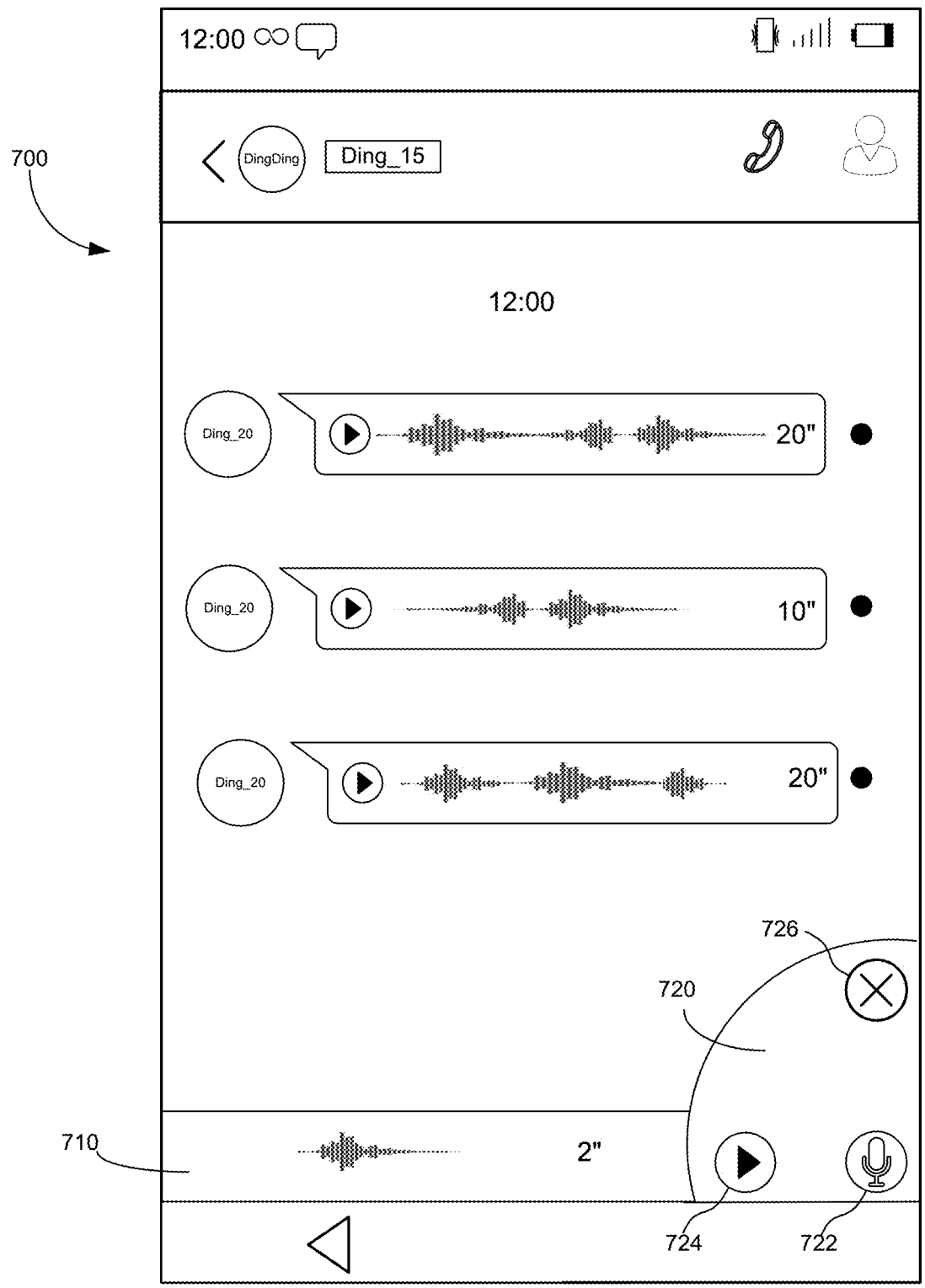
FIGS. 7-8 present diagrams illustrating exemplary appearances of the message page when a current user is operating the audio-input control, in accordance with an embodiment of the present invention.
Figure 8:
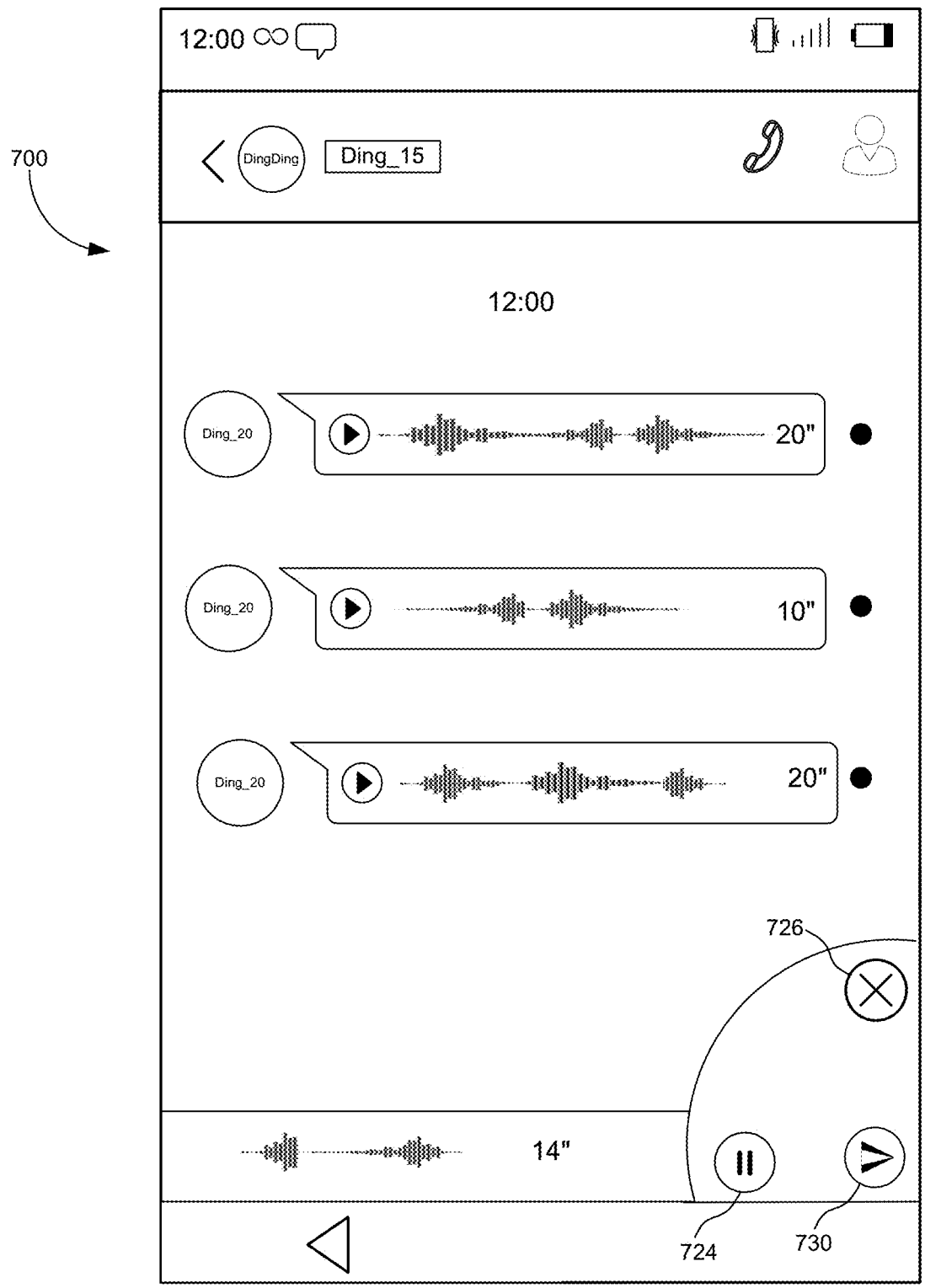

FIGS. 7-8 present diagrams illustrating exemplary appearances of the message page when a current user is operating the audio-input control, in accordance with an embodiment of the present invention. In some embodiments, when the current user presses and holds audio-input control 636 shown in FIG. 6, page 600 updates its appearance to become page 700. The control area and the message-display area of page 700 are similar to that of page 600. Instead of a message-input area, page 700 includes a waveform-display area 710 and an audio-control area 720.

Waveform-display area 710 displays, in real time, the waveform of the recorded audio message along with its time duration. Audio-control area 720 includes a number of controls, such as audio-input control 722, audio-preview control 724, and cancel button 726. Audio-input control 722 is similar to audio-input control 636 shown in FIG. 6. When audio-input control 722 is pressed and held, the microphone of the client device is turned on to record audio messages. Releasing audio-input control 722 can stop the recording and result in the recorded message being sent to the recipient (e.g., Ding_15 in this example). On the other hand, when the current user completes his recording, instead of releasing audio-input control 722, the current user can slide his finger to the left to audio-review control 724. Such an operation can stop the audio recording and start the replay of the recorded audio message. Once the user's finger reaches audio-review control 724, audio-control area 720 updates its appearance, as shown in FIG. 8. In the example shown in FIG. 7, audio-review control 724 is located to the left of audio-input control 722. In practice, audio-review control 724 can be located anywhere within audio-control area 720, and the user can start replaying the message by sliding his finger toward the location of audio-review control 724.

More specifically, audio-preview control 724 changes its appearance from a "play" symbol (as indicated by a triangle) to a "pause" symbol (as indicated by double lines), and audio-input control 722 is replaced with a "send" button 730 (illustrated as the shape of a paper airplane). When the message is replayed, a user can pause the replay by tapping audio-preview control 724. The user can send the recorded audio message by tapping send button 730. On the other hand, cancel button 726 allows the user to cancel the entire audio-input operation and delete the recorded message. The user can also cancel the audio-input operation while recording the audio message. To do so, the user can simply slide his finger from audio-input control 722 to cancel button 726. In some embodiments, the system can process the recorded audio message, such as noise filtering and reduction, before sending it to the recipient.

Figure 9:
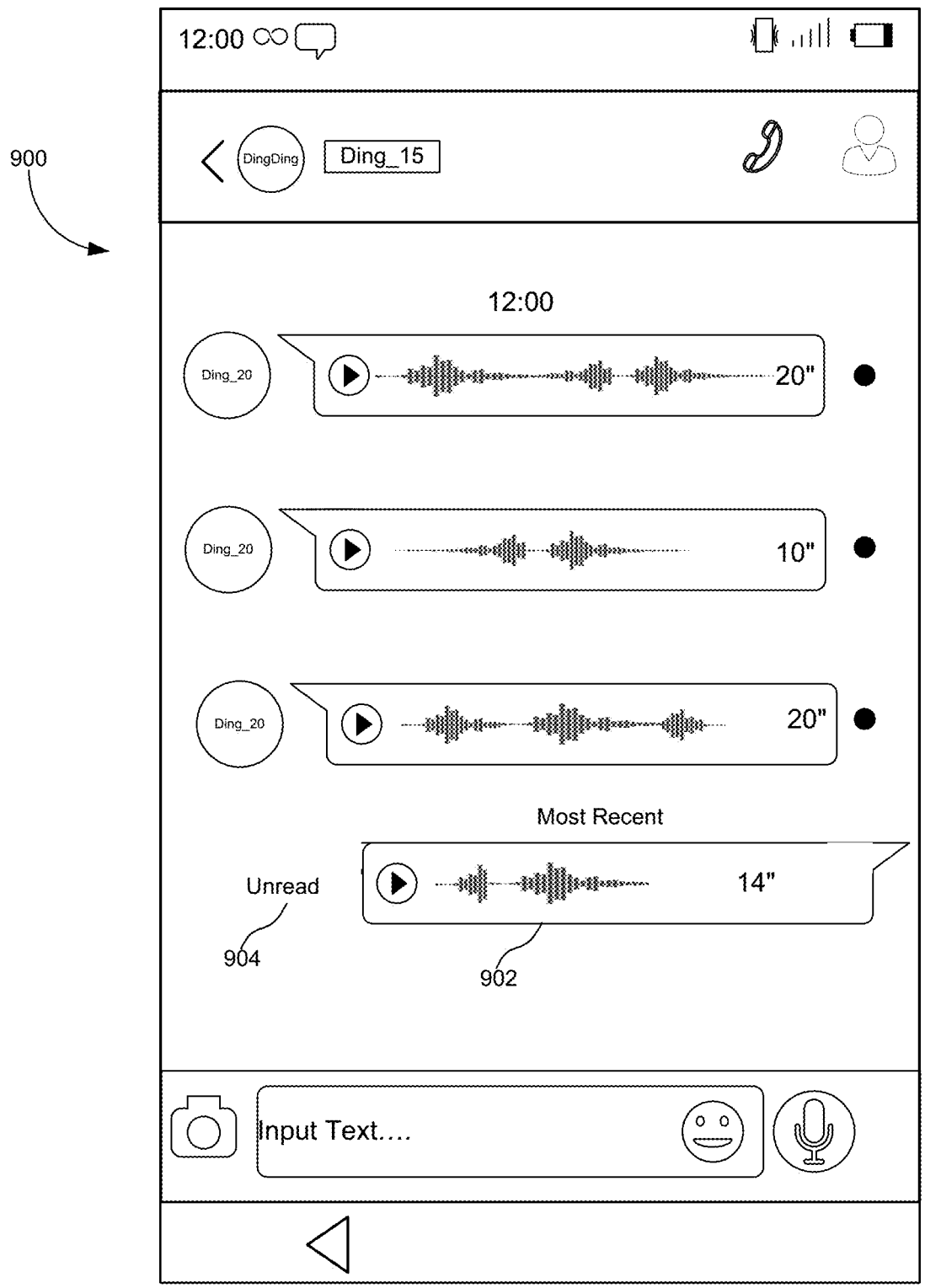
FIG. 9 presents a diagram illustrating an exemplary appearance of the message page after the current user sends an audio message, according to an embodiment of the present invention.

FIG. 9 presents a diagram illustrating an exemplary appearance of the message page after the current user sends an audio message, according to an embodiment of the present invention. As shown in FIG. 9, after an audio message is sent (with or without replay), audio-message 902 is displayed in the message-display area of page 900 as a sent message. A status indicator 904 is also displayed next to sent message 902 to indicate to the current user whether sent message 904 has been read (or played) by the recipient.

Figure 10:
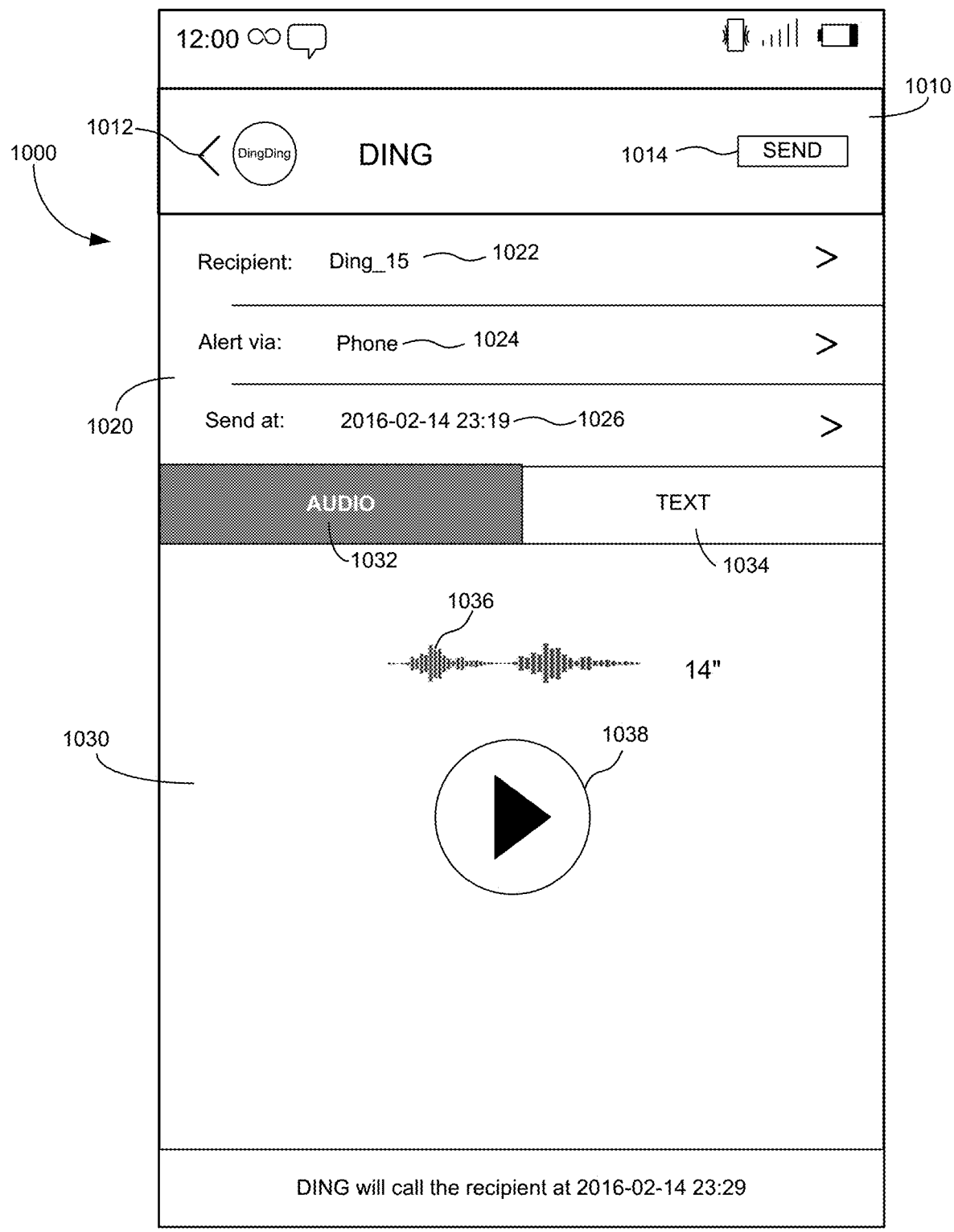
FIG. 10 presents a diagram illustrating an exemplary DING page, in accordance with an embodiment of the present invention.

To remind the recipient to read/play message 902 to read/play message 902, the current user can send a "Ding" message to the recipient. A "Ding" message is a special forced reminder sent by the system or by a user to other users. It is different from the instant message sent between users. More specifically, a "Ding" message can be delivered to users via a communication channel that is different from the messaging system. For example, a "Ding" message can be sent via a telephone channel or an SMS channel. It is also possible for a "Ding" message to be sent as an in-app notification. A "Ding" message can be used to remind a user that a received message has not been read, viewed, or played. In addition, because most people tend to respond to telephone calls or SMS messages in a timely manner, a "Ding" message can also be used to send important time-sensitive information, such as meeting notifications, task assignments, etc. In this disclosure, sending a "Ding" message to a particular user can also be referred to as "'Dinging' the user." A "Ding" message can include text, emoji, graphics, audio, and video messages, and can be edited or sent via a "Ding" message. FIG. 10 presents a diagram illustrating an exemplary DING page, in accordance with an embodiment of the present invention.

In FIG. 10, DING page 1000 includes a control area 1010, an option-input area 1020, and a message-input/display area 1030. Control area 1010 includes a back button 1012 and a send button 1014. Option-input area 1020 can include a number of option-input controls, such as recipient-input control 1022, channel-input control 1024, and timing-input control 1026.

Recipient-input control 1022 allows the current user to input one or more recipients of the "Ding" message. With reference to FIG. 9, to remind user Ding_15 of the unread message 902, the current user can send a "Ding" message to user Ding_15. In some embodiments, DING page 1000 can also be displayed when the current user taps unread message 902 and selects from a pop-up window the "DING" option. In such a scenario, the displayed DING page can set the recipient of the unread message as the default recipient for the "Ding" message.

Channel-input control 1024 allows the current user to select a communication channel for delivering the "Ding" message. Possible communication channels can include phone, SMS, and in-app notification. For example, if the current user's option for the communication channel is "phone" (as shown in FIG. 10), the system will make a phone call to the recipient; if the communication channel is "SMS," the system will send a text message through the SMS service to the phone of the recipient; and if the communication channel is "in-app notification," the system will send a push notification to the one or more recipients and display such push notification in the Ding-message page (which will be discussed in detail later) of the one or more recipients.

Timing-input control 1026 allows the current user to set a delivery time for the "Ding" message. The delivery time can be the current instant or any future time. In some embodiments, the system allows the current user to select a time zone for setting the delivery time. Without specifying a time zone, the delivery time will be in the same time zone of the system time. In the example shown in FIG. 10, the delivery time is set at 23:19, Feb. 14, 2016, the communication channel is phone, and the recipient is Ding_15. Accordingly, the system will call user Ding_15 (using Ding_15's phone number stored in the system) at 23:19, Feb. 14, 2016. In some embodiments, the system can set a default delivery time, such as one minute after the current time. In some embodiments, the delivery time can include a periodic time sequence, such as every 10 minutes. Alternatively, the time interval between the "Ding" messages can be dynamically updated. For example, if a recipient of a message has not read or opened the message for a long time, the system may increase the frequency of sending "Ding" messages for the unread message.

Message-input/display area 1030 allows the user to input the "Ding" message and displays the "Ding" message. Message-input/display area 1030 can include an audio tab 1032 and a text tab 1034. When the current user selects audio tab 1032, the system will allow the user to record an audio message; and when the current user selects text tab 1034, the system will allow the user to input a text message.

In the example shown in FIG. 10, Ding page 1000 is displayed as the result of the current user tapping unread message 902 shown in FIG. 9. Accordingly, message-input/display area 1030 displays a waveform 1036 corresponding to unread message 902. Message-input/display area 1030 also displays a "play" button 1038. The current user can tap "play" button 1038 to replay unread message 902. In addition, the current user can edit unread message 902 or add other information, such as text, emoji, graphics, and additional audio or video clips, to complete the "Ding" message. When the system calls recipient Ding_15 at the set delivery time, the system will play the recorded Ding message to the recipient. Note that, if the "Ding" message includes text, the system can convert the text to a voice message and play the converted voice message to the recipient during the phone call.

In some embodiments, when the "Ding" message is delivered through the "phone" option, the one or more recipients can send back confirmations through their phones. For example, a recipient of the "Ding" message can push a button (such as a particular number key) on his phone to indicate that he has received the "Ding" message. Alternatively, the recipient can record and send an audio confirmation message. For example, after hearing the "Ding" message, the recipient can push a key (e.g., the number "1" key) on his phone to start voice recording and push the "#" key to finish the voice recording. The voice confirmation message can then be sent by the system server to the sender of the "Ding" message.

In some embodiments, if the sender of the "Ding" message is an enterprise individual contact, the system will display the sender information (including its name, enterprise affiliation, job title, etc.) at the recipient's device, even if the recipient did not store such information.

In the example shown in FIG. 10, the current user is manually setting up the delivery of a "Ding" message for unread message 902. In some embodiments, the system may automatically generate reminders ("Ding" messages) for an unread message. For example, if the system detects that the recipient of a message has not read or opened the message 30 minutes after receiving the message, the client device of the sender may automatically generate a "Ding" message, and prompt the sender in the Ding-message page to send such "Ding" message to the recipient. The sender can set delivery options (e.g., phone or SMS) for the system-generated Ding messages. Alternatively, the client device of the sender may automatically send a "Ding" message using a delivery option previously set by the sender.

Figure 11:
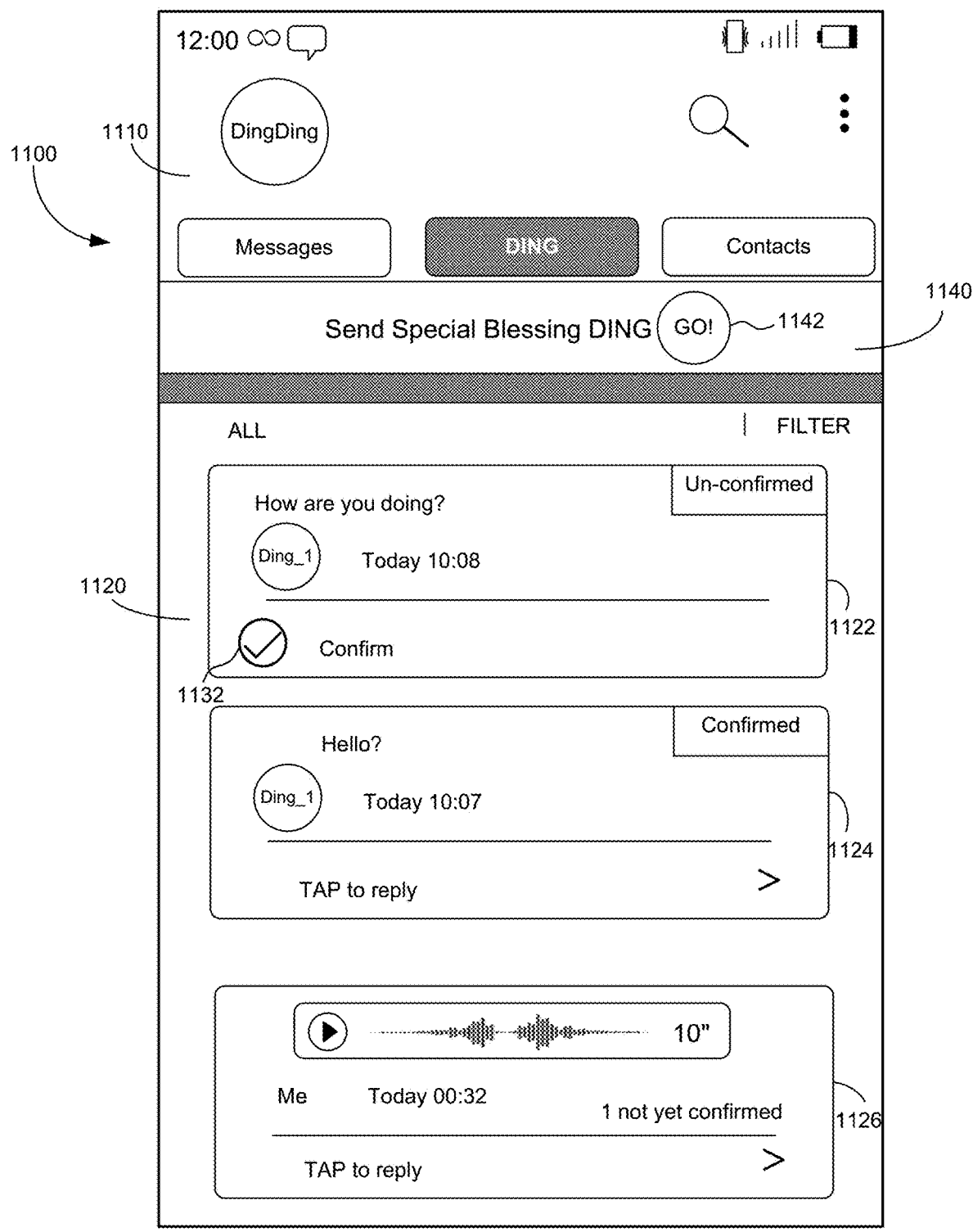
FIG. 11 presents a diagram showing an exemplary Ding-message page, in accordance with an embodiment of the present invention.

Now return to FIG. 2, which includes DING icon 218. The current user can tap DING icon 218 to display a Ding-message page, which lists the DING messages that are sent to or received by the current user. FIG. 11 presents a diagram showing an exemplary Ding-message page, in accordance with an embodiment of the present invention. In FIG. 11, Ding-message page 1100 includes a navigation area 1110 and a Ding-message display area 1120.

Navigation area 1110 is similar to navigation area 210 shown in FIG. 2. Ding-message display area 1120 displays a number of "Ding" messages sent to or received by the current user. Depending on the filter setup, Ding-message display area 1120 may display all "Ding" messages, the sent "Ding" messages, the received "Ding" messages, or "Ding" messages have been previously deleted by the current user. In the example shown in FIG. 11, Ding-message display area 1120 displays "Ding" messages 1122, 1124, and 1126.

"Ding" message 1122 is a received "Ding" message waiting for confirmation. It is marked as "un-confirmed." The current user can tap icon 1132 to confirm receipt of "Ding" message 1122. Such confirmation message can be sent instantly by the system to the sender of "Ding" message 1132. "Ding" message 1124 is marked as "confirmed," meaning the current user has confirmed to the sender the receipt of "Ding" message 1124. Once a Ding message is confirmed, the current user can reply to the "Ding" message using text, emoji, graphics, audio, or video files.

Figure 12:
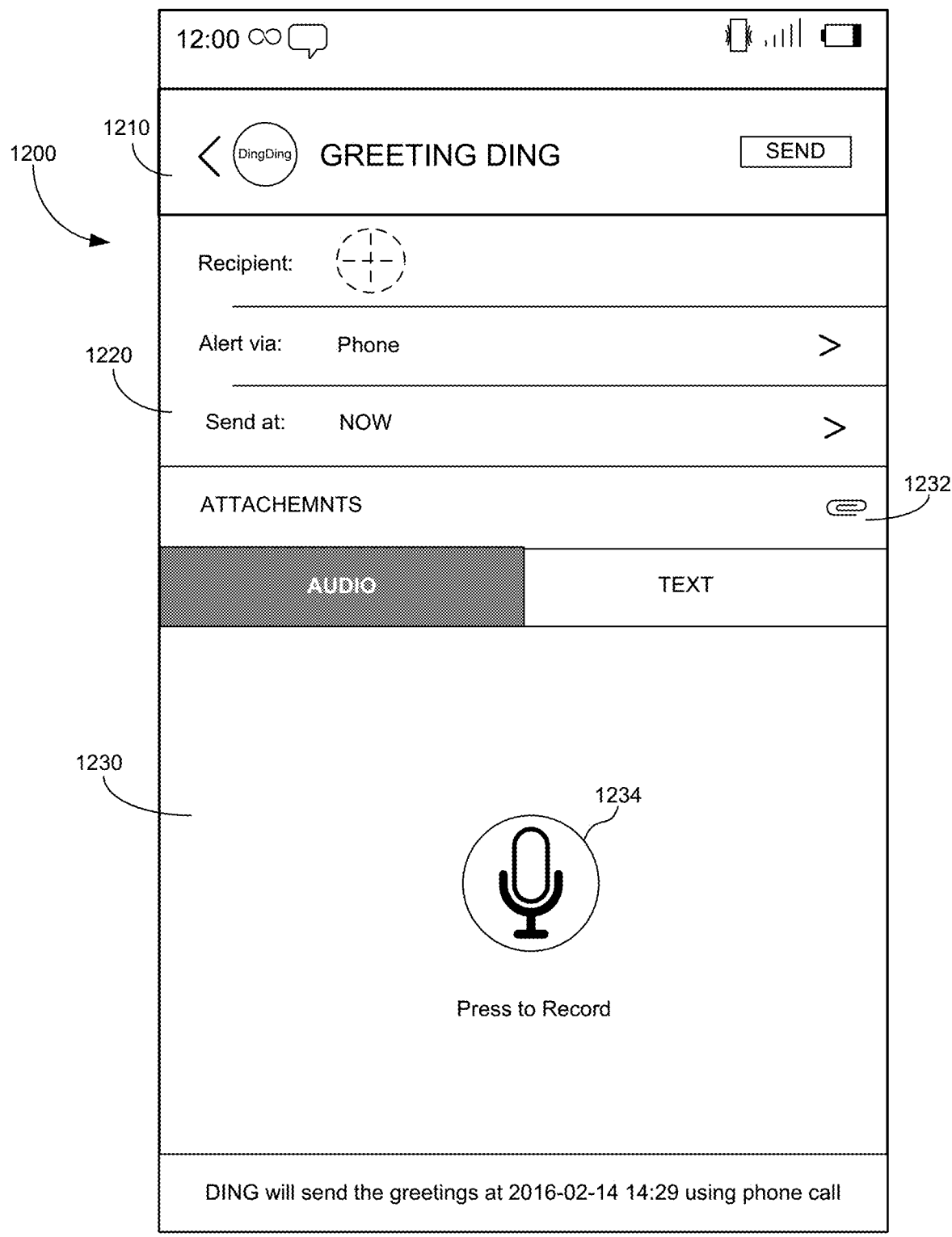
FIG. 12 presents a diagram illustrating an exemplary Greeting Ding page, in accordance with an embodiment of the present invention.

In special circumstances, such as the approaching of a holiday or a special event, Ding-message page 1100 may display a special entry 1140 to allow the user to send special "Ding" messages. For example, right before or during Chinese New Year, special entry 1140 may indicate that users can send New Year's Greeting "Ding" messages. Similarly, around Valentine's Day, users can send "Ding" Valentines to friends. When the current user taps button 1142, a Greeting Ding page will be displayed to allow the user to edit and send greeting Ding messages. FIG. 12 presents a diagram showing an exemplary Greeting Ding page, in accordance with an embodiment of the present invention. Greeting Ding page 1200 shown in FIG. 12 is similar to Ding page 1000 shown in FIG. 10. More specifically, Greeting Ding page 1200 includes a control area 1210 and an option-input area 1220, which are similar to control area 1010 and option-input area 1020. Message-input/display area 1230 can be similar to message-input/display area 1030. In the example shown in FIG. 12, message-input/display area 1230 can include an attachment entry 1232, which allows the user to attach graphics and/or videos to the Greeting "Ding" message sent to the recipient. Note that it is also possible for regular "Ding" page 1000 to include such an attachment entry. In FIG. 12, the current user has selected to input an audio message, and message-input/display area 1230 displays an audio-input control 1234. The current user can press and hold audio-input control 1234 to record an audio message.

In some embodiments, Greeting Ding page 1200 can include special graphic designs corresponding to the special event. For example, if the special event is Chinese New Year, graphics and additional audios or videos that reflect the New Year Celebration (e.g., firecrackers, music, color red, etc.) can be overlaid on Greeting Ding page 1200. Similarly, if the special event is the Chinese Moon Festival, pictures of moons, Chang'e, etc., can be overlaid on Greeting Ding page 1200. Moreover, in addition to the user-generated Greeting "Ding" message, the system can also include special elements related to the special event as part of the "Ding" message delivered to the recipients. For example, if the special event is Christmas, the system may include in an audio Greeting "Ding" message portions of traditional Christmas songs. This way, recipients of these special Greeting "Ding" messages can experience more of the holiday atmosphere. In some embodiments, the system can define a number of special events, including but not limited to: Chinese New Year, Christmas, New Year, Chinese Moon Festival, National Day, Valentine's Day, etc. The system can also generate default Greeting "Ding" messages, which can include audio or video clips, for these predefined special events. In addition, the system allows the user to define a number of special events, such as a friend's birthday or a wedding anniversary. The system can also generate default Greeting "Ding" messages for such user-defined special events.

Figure 13:
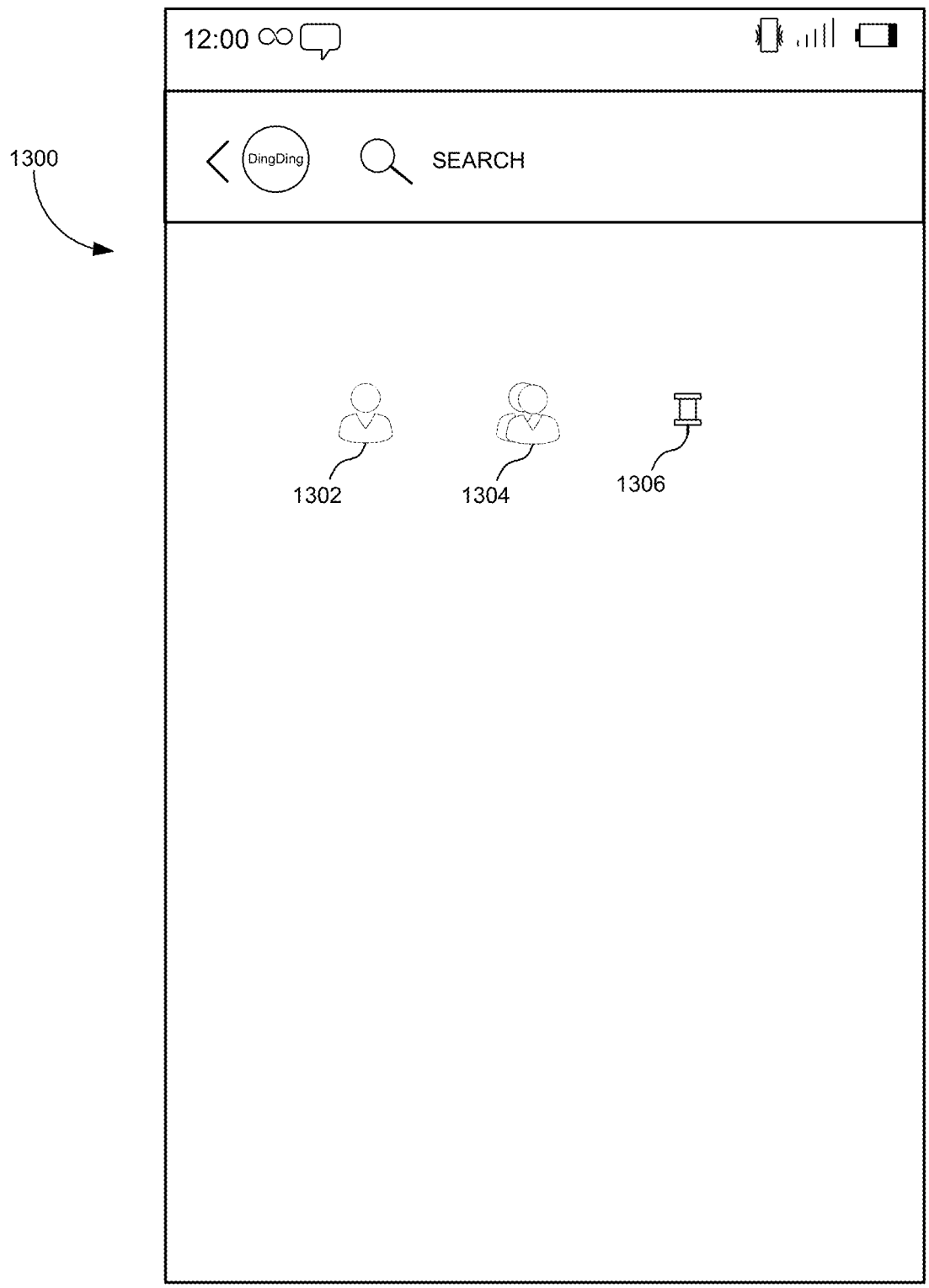
FIG. 13 presents a diagram showing an exemplary search page, in accordance with an embodiment of the present invention.

Now return to FIG. 2, which includes a search icon 212. The current user can tap search icon 212 to display a search page. FIG. 13 presents a diagram showing an exemplary search page, in accordance with an embodiment of the present invention. Search page 1300 allows the current user to search the enterprise/phone contact list, the group list, and the "Ding" messages by tapping icons 1302, 1304, and 1306, respectively.

Figure 14:
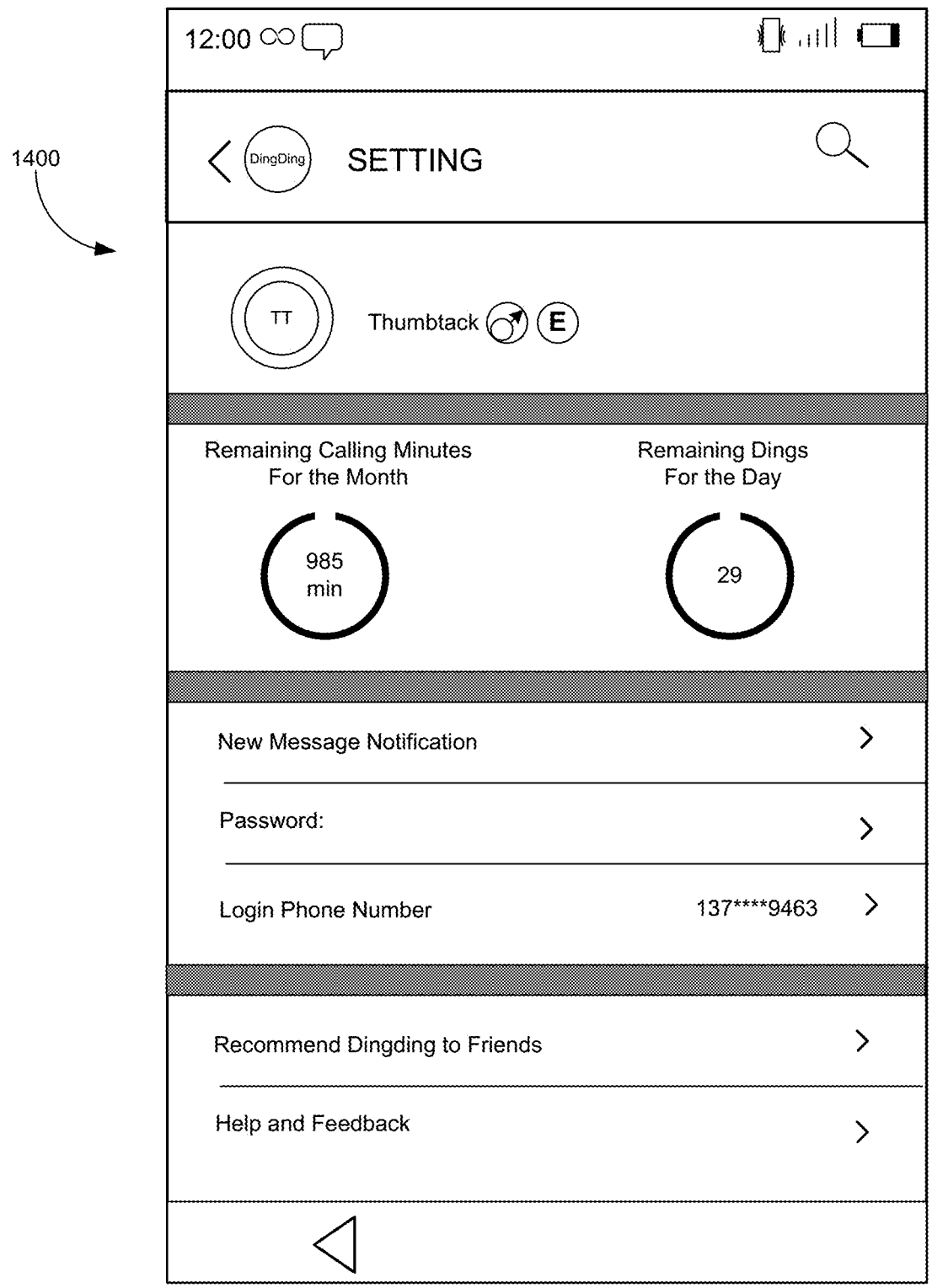
FIG. 14 presents a diagram illustrating a system-setting page, in accordance with an embodiment of the present invention.

FIG. 14 presents a diagram illustrating a system-setting page, in accordance with an embodiment of the present invention. In FIG. 14, system-setting page 1400 allows the user to view remaining free call minutes and messages and configure personal settings. For example, the user can set new message notifications, and change passwords and login phone numbers.

Figure 15:
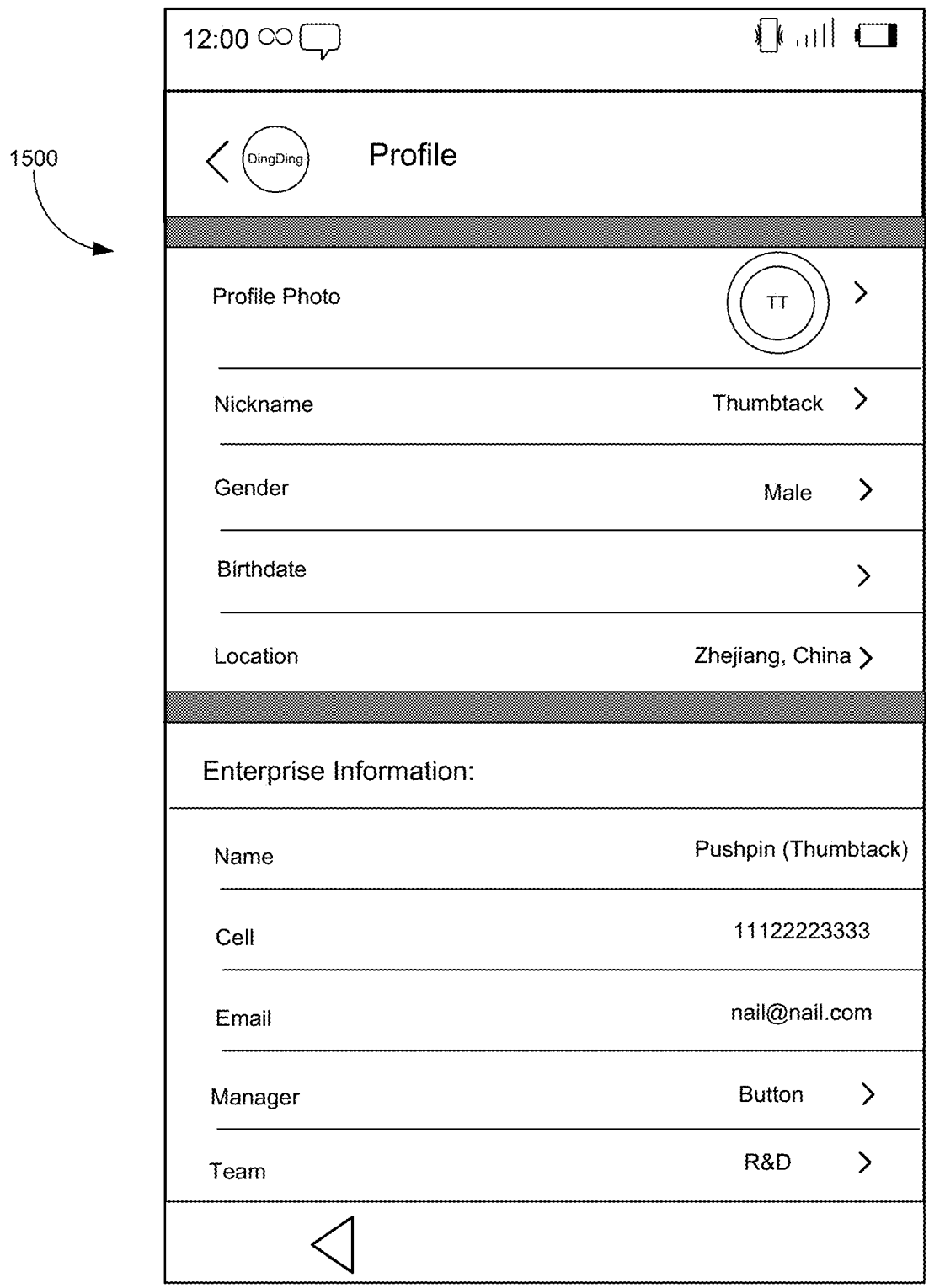
FIG. 15 presents a diagram illustrating a user-profile page, in accordance with an embodiment of the present invention.

FIG. 15 presents a diagram illustrating a user-profile page, in accordance with an embodiment of the present invention. User-profile page 1500 lists both the user's nickname and real name and other personal information (e.g., birthdate and location). If the user belongs to an enterprise, user-profile page 1500 also lists the user's enterprise information, including his company phone number and email address, name of his manager, job title (optional), and team affiliation within the enterprise.

Making Conference Calls Using the Messaging System

Figure 16:
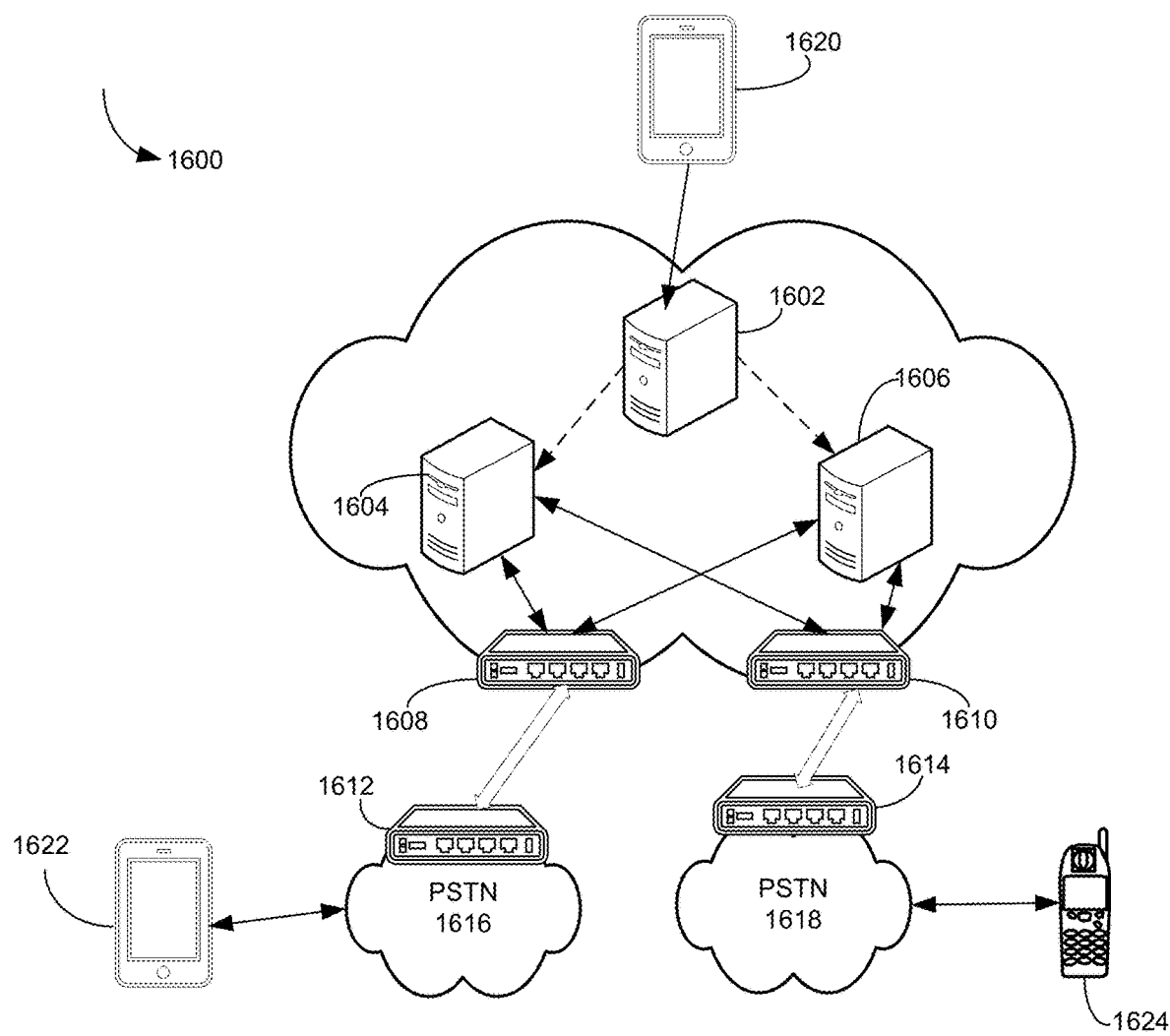
FIG. 16 presents a diagram illustrating an exemplary multicast communication system, in accordance with an embodiment of the present invention.

In some embodiments, this novel messaging system can be used for multicast communication, where a user can communicate simultaneously with multiple other users. Group chat and conference calls are examples of multicast communication. FIG. 16 presents a diagram illustrating an exemplary multicast communication system, in accordance with an embodiment of the present invention. In FIG. 16, multicast communication system 1600 includes a multicast communication business server 1602, exchange servers 1604 and 1606, session boarder controllers (SBCs) 1608-1614, PSTNs 1616 and 1618, main caller 1620, and receivers 1622 and 1624.

Main caller 1620 can include portable communication devices and can be equipped with the client-side module of the communication system. Receivers can include portable and non-portable communication devices, such as a landline telephone. It may or may not be equipped with the client-side module of the communication system. During operation, main caller 1620 can log in to the communication system at a client-side terminal device (or client device for short) and initialize a conference call via the client device. The client device can communicate with the server through various communication channels, including but not limited to: a Wi-Fi® network, a cellular network (e.g., a 2G, 3G, or 4G telecommunication network), etc. The request for the conference call can be sent from the client device to the server using Hypertext Transfer Protocol (HTTP). In some embodiments, the conference call request can include user contact information associated with participants, including the main caller, of the conference call. The user contact information can include user name, communication identifiers (e.g., phone numbers) for users, and a group identifier for the group included in the conference call.

Multicast communication business server (or business server for short) 1602 is responsible for maintaining a user-contact-information database and/or a user-group information database. The user-contact-information database stores user contact information, including user name and phone numbers. The user-group-information database stores identifiers of user groups, members of each group, and phone numbers of the members. User-group-information database can further store the authority of each user in a group. If a user group is an enterprise, the user-group-information database can further store the job titles of the employees of the enterprise. When business server 1602 receives a conference call request from a client device, business server 1602 can query the user-contact-information database and/or the user-group-information database to obtain the phone numbers (or other types of communication identifiers) of the main caller and other participants of the conference call. Alternatively, these phone numbers can be carried by the conference call request and sent to business server 1602.

Upon determining the phone numbers of participants of the conference call, business server 1602 can send these numbers to exchange servers (e.g., exchange servers 1604 and 1606), which in turn send call a request to the communication networks corresponding to these phone numbers. In the example shown in FIG. 16, to call client device 1622, the exchange servers need to send a call request to PSTN 1616. For voice-over-IP (VoIP) conference calls, session border controllers (SBCs) can be used to control the signaling and media paths among the participants of the conference call. The SBCs can operate based on the session initiation protocol (SIP).

Once the exchange servers establish connection to the phone number of main caller 1620, as well as the phone number of other participants of the conference call, they can send the connection-status update back to business server 1602, and send the voice from a conference call participant to other participants according to the control of business server 1602. Business server 1602 can also detect the connectivity of the client device of each participant. Upon a client device establishing a connection to business server 1602, business server 1602 can send the connection status of the client device to other client devices.

In some embodiments, upon receiving the conference call request from the main caller, the business server can also generate, based on the conference call, a conference call phone number and a corresponding password. A conference call participant can send a call request to business server 1602, specifying the conference call phone number as the callee. Upon receiving the request, business server 1602 verifies the password provided by the participant, and adds the participant to the conference call. Business server 1602 can then send the voice from the newly added participant to other participants.

In some embodiments, once the main caller starts a conference call, a conference-call control interface will be displayed on the client device of the main caller. The conference-call control interface can include a control for adding participants. The main caller can use such a control to request business server 1602 to add a new participant to the existing conference call. Operating this control can also result in the contact information of the new participant being displayed in the conference-call control interface. Upon receiving the request to add a participant to the conference call, business server 1602 can obtain the phone number of the added participant and initialize a call to that number. Once the newly added participant answers the call, business server 1602 can send voices from other participants to the newly added participant.

In some embodiments, business server 1602 can grant and distribute a control authority to a particular participant of the conference call. The control authority can include blocking the voice of one or more participants of the conference call, and/or disconnecting one or more participants from the conference call. In a preferred embodiment, the main caller is granted the control authority. After starting a conference call, the main caller can control the status of other participants using the control authority. The conference-call control interface on the client device of the main caller can include control buttons corresponding to other participants. The main caller can tap a control button to display one or more control options for a particular participant. When the main caller selects a control option for the participant, the client device of the main caller will send a control command to business server 1602, which in turn controls the communication status of the participant based on the control command. The control commands can include blocking (muting) the voice of the participant, and disconnecting the participant. In one embodiment, the main caller may request business server 1602 to transfer the control authority to a different user participating the conference call. Accordingly, business server 1602 can set the authority of the corresponding user, and send information associated with the control authority to the corresponding user.

Figure 17:
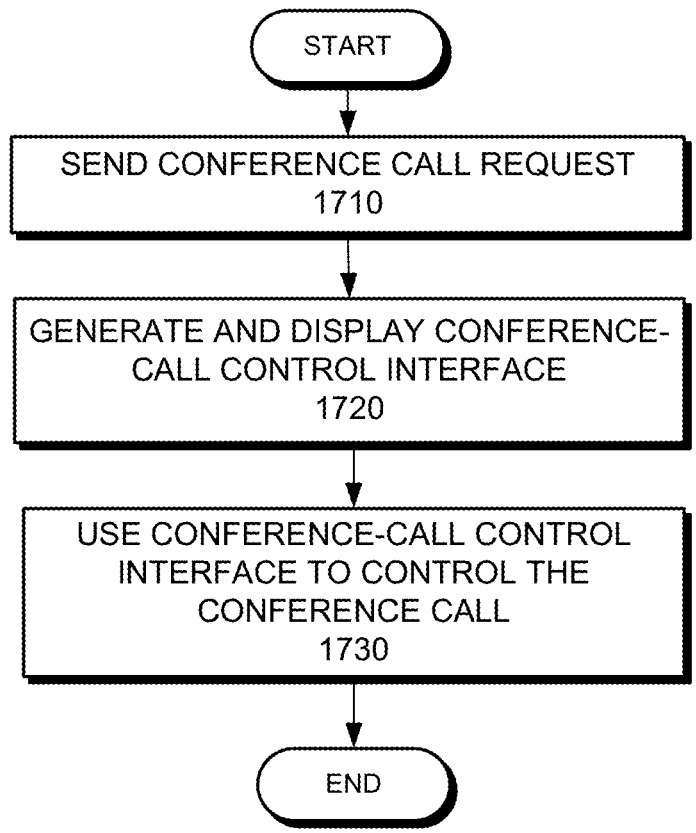
FIG. 17 presents a diagram illustrating an exemplary client process for a initializing a conference call, in accordance with an embodiment of the present invention.

FIG. 17 presents a diagram illustrating an exemplary client process for a initializing a conference call, in accordance with an embodiment of the present invention. During operation, the client device of the main caller sends a request for a conference call, which includes multiple contacts (operation 1710). The client device of the main caller can load the user's local address book (e.g., the address book of a smartphone), and can download a remote address book from the server. The local address book can typically include contact information (e.g., phone numbers) of the current user's family members, friends, colleagues, etc. The remote address book can be maintained by the user remotely via the Internet. For example, a remote address book may include the address book of an enterprise, and include names and phone numbers of employees of the enterprise. When the client device requests one or more contacts from the remote address book, it can obtain names and phone numbers of those contacts. While generating the conference-call request, the main caller can select, from the local address book and/or the remote address book, one or more contacts, and send information associated with those contacts to the server as part of the conference-call request.

In some embodiments, information associated with a contact can include the name of the contact, a communication identifier (e.g., a phone number), and a group identifier for the group included in the conference call. The server queries the user-group-information database using the group identifier to obtain the phone numbers (or other types of communication identifiers) of members of the group.

Upon receiving the conference-call request, the business server can send, via various telephone networks (e.g., PSTN), voice-call requests to phone numbers specified by the conference-call request. In response to receiving such a voice-call request, a client device can generate and display, based on the user command for accepting the voice-call request, a conference-call control interface (operation 1720). The conference-call control interface can display icons representing participants of the conference call and their connection status. In some embodiments, the business server sends the connection status of the participants to each participating client device, which then updates the displayed connection status. For example, if a participant answers the call, his connection status will be updated to "connected" (e.g., by highlighting his icon) on all client devices.

A client device having the control authority can then control the conference call using the conference-call control interface (operation 1730). The conference-call control interface can communicate with the business server using various network communication protocols, such as HTTP. The conference-call control interface can include a control option for adding participants. The client device can send a request, using the control option, for adding one or more participants to the conference call, and add icons corresponding to the one or more added participants on the conference-call control interface.

The conference-call control interface can include one or more controls for each participant of the conference call. The control can be used to display options (e.g., in the form of control buttons) associated with the communication status of a selected participant. For example, the conference-call control interface can include one or more control buttons that can control the communication status of one or more participants. When the user with the control authority (e.g., the main caller) operates the control buttons, the client device can send to the business server a control command regarding the communication status of a participant. The business server can then control the communication status of the participant according to the command. Exemplary control commands can include a command to block the voice of a participant and a command to disconnect a participant.

The control buttons can include a mute button and a disconnect button. The user with the control authority can tap the mute button to send a request to block the voice of a corresponding participant. Similarly, the user can tap the disconnect button to send a request to disconnect a corresponding participant. The client device can further update the displayed communication status of the participant after the server responds to the request.

Figure 18:
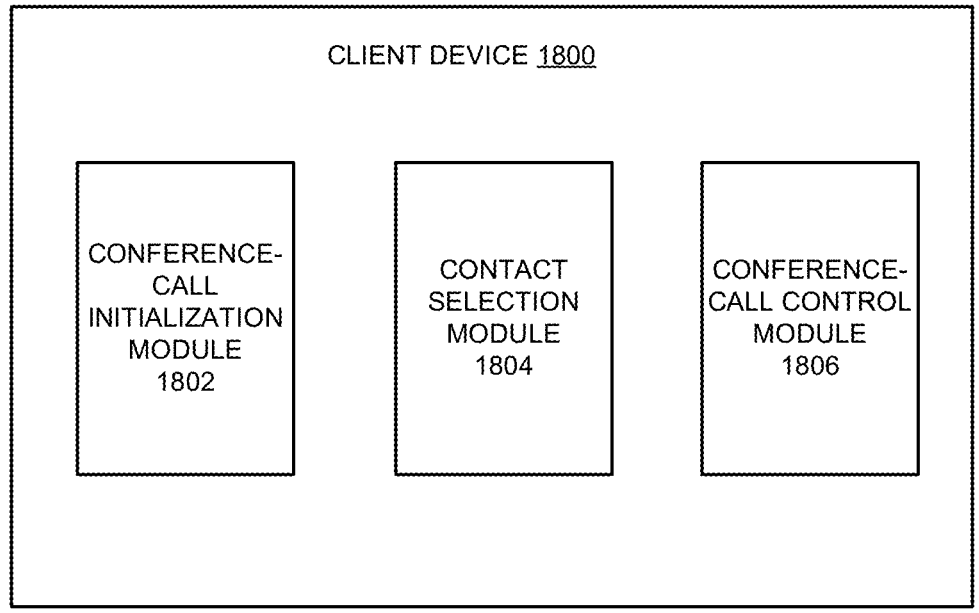
FIG. 18 presents a diagram illustrating an exemplary client device, in accordance with an embodiment of the present invention.

FIG. 18 presents a diagram illustrating an exemplary client device, in accordance with an embodiment of the present invention. Client device 1800 includes a conference-call initialization module 1802, a contact selection module 1804, and a conference-call control module 1806.

Conference-call initialization module 1802 is responsible for generating and sending conference-call requests, and for uploading information associated with participants of the conference call. Conference-call initialization module 1802 can send the conference-call request to the communication server using HTTP. Contact selection module 1804 is responsible for loading a local address book and or requesting, from the server, a remote address book, and selects, based on the user command, one or more contacts from the address books as participants of the conference call. Conference-call control module 1806 is responsible for detecting the user's response for a conference-call request. If the user accepts the conference-call, conference-call control module 1806 generates and displays a conference-call control interface. Conference-call control module 1806 updates the communication status of participants based on feedback from the communication server. For example, when a participant connects to the conference call, conference-call control module 1806 configures the conference-call control interface to light up the icon representing the participant.

A user with control authority can input control commands in the conference-call control interface to control the communication status of one or more participants. Conference-call control module 1806 receives an input control command from the user and sends the user command to the server to allow the server to control the communication status of the one or more participants accordingly.

Figure 19:
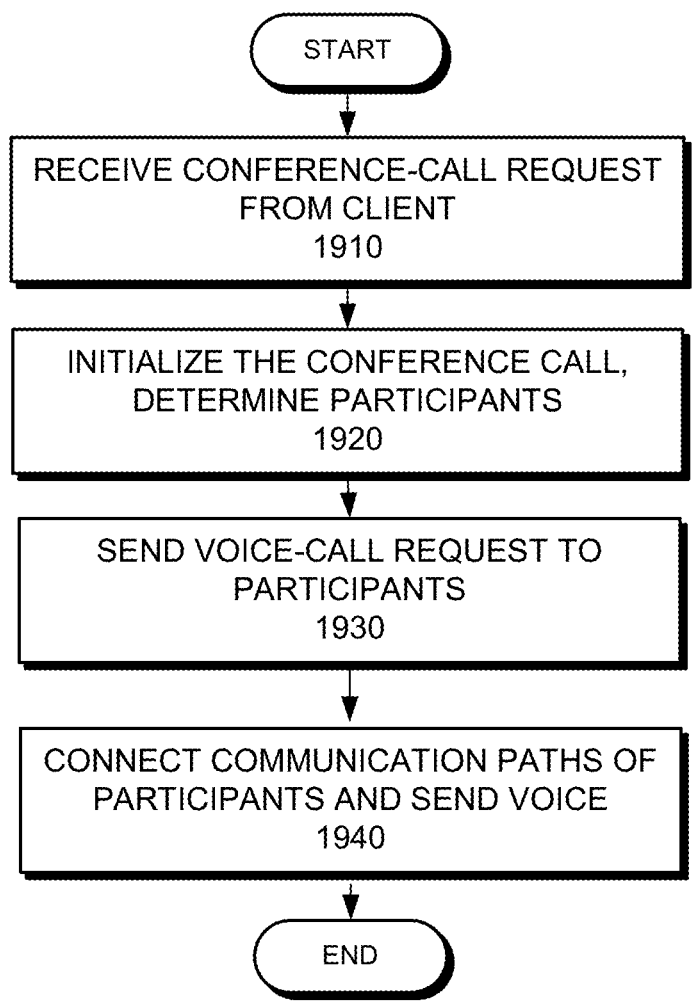
FIG. 19 presents a diagram illustrating an exemplary server process for a initializing a conference call, in accordance with an embodiment of the present invention.

FIG. 19 presents a diagram illustrating an exemplary server process for a initializing a conference call, in accordance with an embodiment of the present invention. During operation, the communication server receives a conference-call request from a client (operation 1910). The conference-call request can be sent using HTTP. In response to the conference-call request, the communication server initializes a conference call, and determines, based on the conference-call request, participants of the conference call (operation 1920).

In some embodiments, the communication server can obtain contact information of the participants from the conference-call request. Contact information associated with a participant can include the name of the participant, a communication identifier (e.g., a phone number), and a group identifier for the group included in the conference call. If the contact information only includes a name, the communication server can query the user-contact-information database to obtain the phone number (or other types of communication identifiers) associated with the name. If the contact information includes a group name, the communication server can query the user-group-information database using the group identifier to obtain the phone numbers (or other types of communication identifiers) of members of the group.

Subsequently, the communication server can send voice-call requests to phone numbers corresponding to the participants of the conference call (operation 1930). More specifically, once the communication server determines the phone numbers of the participants, it can send those numbers to exchange servers. The exchange servers can then send voice-call requests to networks from which the phone numbers obtain services. In some embodiments, SBCs can send requests for voice-calls to the PSTNs corresponding to the phone numbers.

The communication server can then connect communication paths of participants and send voice (operation 1940). Once the exchange server has connected to the phone numbers of the main caller and other participants, the exchange server can send the connectivity report to the communication server. The communication server can then instruct the exchange server to send voice from a participant to other participants. The communication server also detects the connectivity of the client devices. When a client device establishes connection, the communication server will update the connectivity status of the client to other participating clients.

Figure 20:
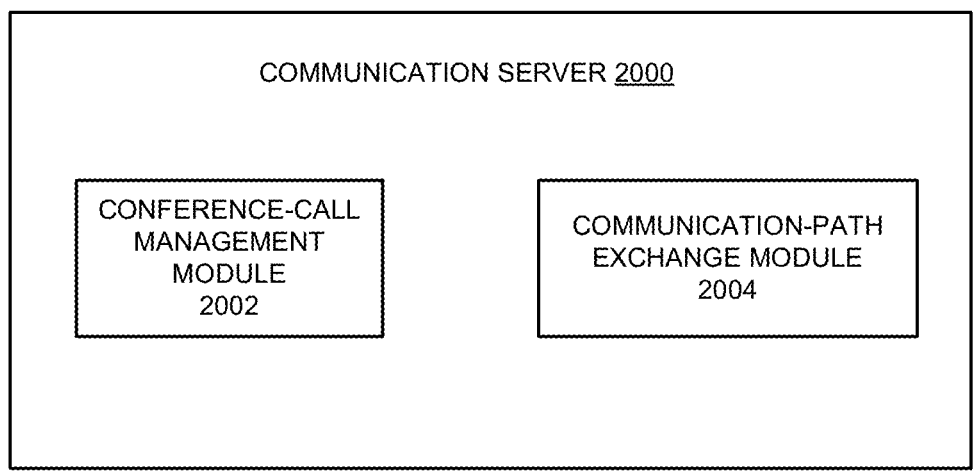
FIG. 20 presents a diagram illustrating an exemplary communication server, in accordance with an embodiment of the present invention.

FIG. 20 presents a diagram illustrating an exemplary communication server, in accordance with an embodiment of the present invention. Communication server 2000 includes a conference-call management module 2002 and a communication-path exchange module 2004.

Conference-call management module 2002 is responsible for receiving conference-call requests and establishing a conference-call "room" based on the received requests. Conference-call management module 2002 can also assign a conference-call identifier for each conference call "room." Communication-path exchange module 2004 is responsible for making voice calls to participants and to send voice from one participant to other participants. When communication-path exchange module 2004 receives a call request with a conference-call identifier, communication-path exchange module 2004 extends the communication path to the sender of the call request.

In addition, conference-call management module 2002 can grant the control authority to a participant (which typically is the main caller). The control authority can allow the main caller to control communication status of other participants. During the conference call, conference-call management module 2002 can receive a control command from a user and determines whether the user has the control authority. If so, conference-call management module 2002 can control communication status of participants based on the received command.

Figure 21:
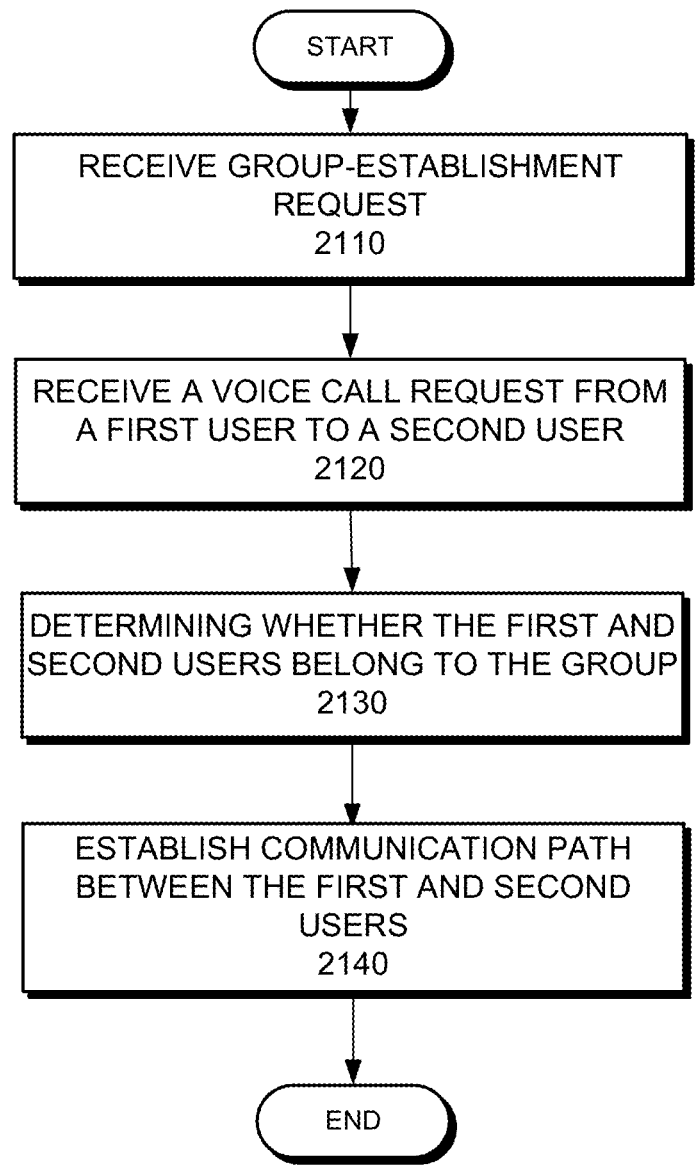
FIG. 21 presents a flowchart illustrating an exemplary group communication process, in accordance with an embodiment of the present invention.

FIG. 21 presents a flowchart illustrating an exemplary group communication process, in accordance with an embodiment of the present invention. During operation, a multicast communication server can receive a request for establishing a communication group that includes one or more users (operation 2110). The multicast communication server can maintain a user-group-information database for one or more communication groups. Entries in the database for a communication group include names of the group members and their communication identifiers (e.g., phone numbers). Moreover, the database can record the title of a group member and his granted authority. The multicast communication server can edit and modify the member information based on users' operation commands. In some embodiments, a communication group can be an enterprise, and the group members can include employees of the enterprise.

The multicast communication server can receive a voice-call request sent from a first user to a second user (operation 2120). Such a voice-call request can be sent via HTTP. The server determines whether the first and second users belong to an established communication group (operation 2130). If both users belong to the communication group and have authority to communicate within the group, the server can send voice-call requests to both users. When the server receives responses from the users, the server can establish a communication path between the two users (operation 2140). By determining the user competence authority before establishing connections, the server can enhance the security of the group communication.

During operation, the server can also send the group affiliation information of the first user to the second user for display. In some embodiments, the system can also limit the competence authority of one or more group members, based on user commands. For example, when the server received a call request from a first user destined to the second user, if the server determines that the second user's competence authority is limited, the server can reject the call request from the first user.

Computer and Communication System

Figure 22:
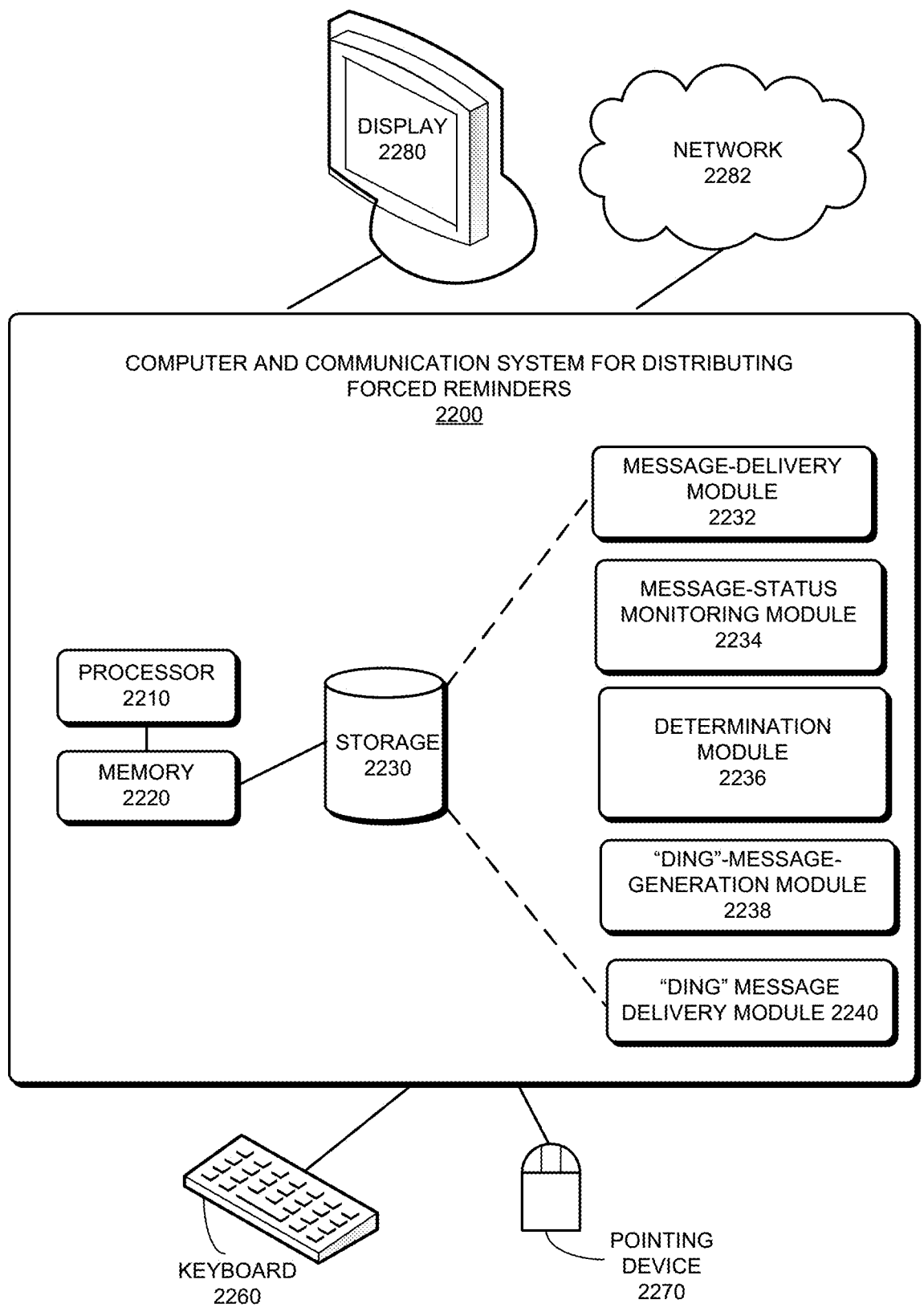
FIG. 22 illustrates an exemplary computer and communication system for distributing forced reminders, in accordance with an embodiment of the present invention.

FIG. 22 illustrates an exemplary computer and communication system for distributing forced reminders, in accordance with an embodiment of the present invention. In FIG. 22, system 2200 includes a processor 2210, a memory 2220, and a storage 2230. Storage 2230 typically stores instructions that can be loaded into memory 2220 and executed by processor 2210 to perform the methods mentioned above. As a result, system 2200 can perform the functions described above.

In one embodiment, the instructions in storage 2230 can implement a message-delivery module 2232, a message-status monitoring module 2234, a determination module 2236, a "Ding"-message-generation module 2238, and a "Ding"-message-delivery module 2240, all of which can be in communication with each other through various means.

Message-delivery module 2232 can deliver regular messages (e.g., IM messages) to one or more contacts of the user. Message-status monitoring module 2234 monitors the status of the delivered messages to determine whether a message has been viewed or opened by the recipient. Determination module 2236 can determine whether a trigger condition (e.g., the message has not been viewed after a predetermined time period) has been met based on the monitored status of a delivered message. "Ding"-message-generation module 2236 can generate, in response to determination module 2236 determining that the trigger condition has been met or to user's command, a "Ding" message. In some embodiments, "Ding"-message-generation module 2238 can display a user interface and generate the "Ding" message based on user input via the user interface. "Ding"-message-delivery module 2240 can deliver the "Ding" message. The user can specify the recipient, the communication channel, and the delivery time of the "Ding" message.

In some embodiments, modules 2232, 2234, 2236, 2238, and 2240 can be partially or entirely implemented in hardware and can be part of processor 2210. Further, in some embodiments, the system may not include a separate processor and memory. Instead, in addition to performing their specific tasks, modules 2232, 2234, 2236, 2238, and 2240, either separately or in concert, may be part of general- or special-purpose computation engines.

System 2200 can be coupled to an optional display 2280 (which can be a touchscreen display), keyboard 2260, and pointing device 2270, and can also be coupled via one or more network interfaces to network 2282.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-executable method, comprising:
   displaying, by a client device, a user interface, wherein the user interface includes a menu item associated with forced reminders;

in response to a user selecting the menu item, displaying a forced-reminder user interface, wherein the forced-reminder user interface includes a content display area configured to display one or more forced-reminder messages, wherein a respective forced-reminder message is associated with a message sent via a first communication channel and is configured to serve as a reminder for a recipient of the sent message;

in response to the user entering a command in the forced-reminder user interface, displaying a forced-reminder-message-generation user interface, wherein the forced-reminder-message-generation user interface includes an input control area, wherein the input control area includes a communication-channel input control and a timing input control for allowing the user to specify a communication channel and an indication of time, respectively, for delivering the forced-reminder message to remind the recipient that the sent message is unread, and wherein the specified communication channel is different from the first communication channel.

2. The method of claim 1, further comprising:
in response to the user configuring a filtering option in the forced-reminder user interface, displaying at least one of:
all forced-reminder messages associated with the user;
one or more forced-reminder messages received by the user;
one or more forced-reminder messages sent by the user; and
one or more forced-reminder messages deleted by the user.

3. The method of claim 1, further comprising:
in response to receiving confirmation-status information associated with the forced-reminder message, displaying the confirmation status information to indicate whether the recipient has confirmed the forced-reminder message.

4. The method of claim 3, further comprising:
in response to the user configuring a filtering option in the forced-reminder user interface, displaying at least one of:
one or more forced-reminder messages that are confirmed by all recipients;
one or more forced-reminder messages that are confirmed by a portion of recipients; and
one or more forced-reminder messages that have not been confirmed by any recipient.

5. The method of claim 1, wherein the input control area further includes:
a recipient input control for allowing the user to specify one or more recipients of a generated forced-reminder message.

6. The method of claim 1, wherein the specified communication channel includes one of:
a telephone channel; and
a short-message-service (SMS) channel.

7. The method of claim 6, further comprising:
in response to the user specifying the communication channel as the telephone channel, making a voice call to the recipient at the indicated time; and
in response to the recipient answering the voice call, playing the generated forced-reminder message to the recipient.

8. The method of claim 1, wherein the forced-reminder message includes a system-generated audio message that is specific to a predetermined special event, and wherein the system-generated audio message is overlaid over an audio message recorded by the user.

9. The method of claim 8, wherein the system-generate audio message includes one or more of:
a holiday greeting;
a birthday greeting; and
an anniversary greeting.

10. The method of claim 1, wherein the forced-reminder message includes one or more of:
text;
emoji;
graphics;
audio; and
video.

11. A computer system, comprising:
a processor;
a memory storing instructions that when executed by the processor cause the computer system to perform a method, the method comprising:
displaying a user interface, wherein the user interface includes a menu item associated with forced reminders;
in response to a user selecting the menu item, displaying a forced-reminder user interface, wherein the forced-reminder user interface includes a content display area configured to display one or more forced-reminder messages, wherein a respective forced-reminder message is associated with a message sent via a first communication channel and is configured to serve as a reminder for a recipient of the sent message;
in response to the user entering a command in the forced-reminder user interface, displaying a forced-reminder-message-generation user interface, wherein the forced-reminder-message-generation user interface includes an input control area, wherein the input control area includes a communication-channel input control and a timing input control for allowing the user to specify a communication channel and an indication of time, respectively, for delivering the forced reminder message to remind the recipient that the sent message is unread, and wherein the specified communication channel is different from the first communication channel.

12. The computer system of claim 11, wherein the method further comprises:
in response to the user configuring a filtering option in the forced-reminder user interface, displaying at least one of:
all forced-reminder messages associated with the user;
one or more forced-reminder messages received by the user;
one or more forced-reminder messages sent by the user; and
one or more forced-reminder messages deleted by the user.

13. The computer system of claim 11, wherein the method further comprises:
in response to receiving confirmation-status information associated with the forced-reminder message, displaying the confirmation status information to indicate whether the recipient has confirmed the forced-reminder message.

14. The computer system of claim 13, wherein the method further comprises:

in response to the user configuring a filtering option in the forced-reminder user interface, displaying at least one of:
- one or more forced-reminder messages that are confirmed by all recipients;
- one or more forced-reminder messages that are confirmed by a portion of recipients; and
- one or more forced-reminder messages that have not been confirmed by any recipient.

15. The computer system of claim 11, wherein the input control area further includes:
a recipient input control for allowing the user to specify one or more recipients of a generated forced-reminder message.

16. The computer system of claim 11, wherein the specified communication channel includes one of:
a telephone channel; and
a short-message-service (SMS) channel.

17. The computer system of claim 16, wherein the method further comprising:
in response to the user specifying the communication channel as the telephone channel, making a voice call to the recipient at the indicated time; and
in response to the recipient answering the voice call, playing the generated forced-reminder message to the recipient.

18. The computer system of claim 11, wherein the forced-reminder message includes a system-generated audio message that is specific to a predetermined special event, and wherein the system-generated audio message is overlaid over an audio message recorded by the user.

19. The computer system of claim 18, wherein the system-generate audio message includes one or more of:
a holiday greeting;
a birthday greeting; and
an anniversary greeting.

20. The computer system of claim 11, wherein the forced-reminder message includes one or more of:
text;
emoji;
graphics;
audio; and
video.

* * * * *